United States Patent
Li et al.

(10) Patent No.: US 10,180,908 B2
(45) Date of Patent: Jan. 15, 2019

(54) METHOD AND APPARATUS FOR VIRTUALIZED CONTROL OF A SHARED SYSTEM CACHE

(71) Applicant: QUALCOMM Incorporated, San Diego, CA (US)

(72) Inventors: Yanru Li, San Diego, CA (US); Subbarao Palacharla, San Diego, CA (US); Moinul Khan, San Diego, CA (US); Alain Artieri, San Diego, CA (US); Azzedine Touzni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 14/710,693

(22) Filed: May 13, 2015

(65) Prior Publication Data

US 2016/0335190 A1   Nov. 17, 2016

(51) Int. Cl.
*G06F 12/08* (2016.01)
*G06F 12/10* (2016.01)
(Continued)

(52) U.S. Cl.
CPC ........ *G06F 12/0888* (2013.01); *G06F 12/084* (2013.01); *G06F 12/0893* (2013.01);
(Continued)

(58) Field of Classification Search
CPC .................. G06F 12/0888; G06F 12/1045
See application file for complete search history.

(56) References Cited

U.S. PATENT DOCUMENTS 5,434,992 A    7/1995  Mattson
5,555,430 A *  9/1996  Gephardt ................ G06F 15/17
                                                       710/260
(Continued)

FOREIGN PATENT DOCUMENTS

EP      0642086 B1    3/1998
EP      1840766 B1   12/2012
WO   2010017020 A1    2/2010

OTHER PUBLICATIONS

International Search Report and Written Opinion—PCT/US2016/027270—ISA/EPO—dated Jun. 23, 2016.
(Continued)

*Primary Examiner* — Charles Rones
*Assistant Examiner* — Tian-Pong Chang
(74) *Attorney, Agent, or Firm* — The Marbury Law Group, PLLC

(57) ABSTRACT

Aspects include computing devices, systems, and methods for implementing a cache maintenance or status operation for a component cache of a system cache. A computing device may generate a component cache configuration table, assign at least one component cache indicator of a component cache to a master of the component cache, and map at least one control register to the component cache indicator by a centralized control entity. The computing device may store the component cache indicator such that the component cache indicator is accessible by the master of the component cache for discovering a virtualized view of the system cache and issuing a cache maintenance or status command for the component cache bypassing the centralized control entity. The computing device may receive the cache maintenance or status command by a control register associated with a cache maintenance or status command and
(Continued)

the component cache bypassing the centralized control entity.

30 Claims, 17 Drawing Sheets

(51) Int. Cl.
    *G06F 12/0888*     (2016.01)
    *G06F 12/084*     (2016.01)
    *G06F 12/0893*     (2016.01)
    *G06F 12/0895*     (2016.01)
    *G06F 12/1045*     (2016.01)

(52) U.S. Cl.
    CPC ...... *G06F 12/0895* (2013.01); *G06F 12/1045* (2013.01); *G06F 2212/1041* (2013.01); *G06F 2212/1044* (2013.01); *G06F 2212/152* (2013.01); *G06F 2212/608* (2013.01); *G06F 2212/65* (2013.01); *Y02D 10/13* (2018.01)

(56) References Cited

U.S. PATENT DOCUMENTS

| | | | |
|---|---|---|---|
| 5,781,926 A | 7/1998 | Gaskins et al. | |
| 5,829,024 A | 10/1998 | Sato | |
| 7,493,448 B2 * | 2/2009 | Yamazaki | G06F 12/084 |
| | | | 711/128 |
| 7,558,920 B2 | 7/2009 | Mattina et al. | |
| 7,613,898 B2 | 11/2009 | Hummel et al. | |
| 7,685,401 B2 | 3/2010 | Sugumar et al. | |
| 8,041,897 B2 * | 10/2011 | Biles | G06F 12/0862 |
| | | | 711/125 |
| 8,386,749 B2 | 2/2013 | Dannowski et al. | |
| 8,533,399 B2 | 9/2013 | Ohmacht | |
| 8,739,159 B2 | 5/2014 | Lin et al. | |
| 2004/0199700 A1 | 10/2004 | Clayton | |
| 2009/0064158 A1 * | 3/2009 | Carter | G06F 11/3419 |
| | | | 718/104 |
| 2010/0005213 A1 | 1/2010 | Butter et al. | |
| 2010/0115233 A1 | 5/2010 | Brewer et al. | |
| 2010/0205377 A1 * | 8/2010 | Moyer | G06F 12/0831 |
| | | | 711/146 |
| 2012/0030430 A1 * | 2/2012 | Hayashi | G06F 12/0842 |
| | | | 711/128 |
| 2012/0166730 A1 * | 6/2012 | Gehman | G06F 13/1668 |
| | | | 711/129 |
| 2013/0111489 A1 | 5/2013 | Glew et al. | |
| 2014/0258634 A1 * | 9/2014 | Cudak | G06F 12/084 |
| | | | 711/130 |
| 2015/0378921 A1 * | 12/2015 | Karippara | G06F 9/45533 |
| | | | 710/308 |

OTHER PUBLICATIONS

Rivers J.A., "Sectored Cache Performance Evaluation: A Case Study on the KSR-1 Data Subcache," Advanced Computer Architecture Lab EECS Dept, the University of Michigan, Oct. 1996, 13 Pages.

* cited by examiner

| Component Cache Identifier | Validity Indicator | Set Shift | Set Offset | Target Ways | Probe All Ways | Index Mode | Replacement Policy | Cache Line Size |
|---|---|---|---|---|---|---|---|---|
| 0 | 1 | 0 | 000 | 0xFF | 1 | 0 (PI) | 0 (MRU) | 128 Bytes |
| 1 | 1 | 3 | 100 | 0x0C | 0 | 1 (CI) | 1 (FIFO) | 32 Bytes |
| 2 | 1 | 1 | 000 | 0xF0 | 1 | 0 (PI) | 2 (Random) | 256 Bytes |
| 3 | 1 | 2 | 110 | 0x78 | 1 | 0 (PI) | 0 (MRU) | 128 Bytes |
| 4 | 1 | 0 | 000 | 0x01 | 0 | 0 (PI) | 0 (FIFO) | 128 Bytes |
| ... | ... | ... | ... | ... | ... | ... | ... | ... |
| N-1 | | | | | | | | |

FIG. 5

METHOD AND APPARATUS FOR VIRTUALIZED CONTROL OF A SHARED SYSTEM CACHE

BACKGROUND

Today's mobile systems-on-chip (SoCs) include multiple subsystems, e.g., Apps CPU, GPU, and Video, that share a common main memory based on DRAM technology. Each of the subsystems employs one or more local memories for fast access to frequently used data and to minimize accesses to main memory. The local memories are typically configured as caches that are either software managed or hardware managed depending on the subsystem needs. Performance scaling across product generations requires increasing the size of the local memories. This scaling strategy suffers the drawback of increased area and static power. Also, in a majority of the use cases, the utilization of the local memories can be low since all of the subsystems are not simultaneously active.

A shared system cache can address these drawbacks by pooling all of the local memories into a shared on-chip memory resource. The system cache can potentially save area since its size is expected to be smaller than the aggregate size of all the local memories. The system cache is also expected to provide significant power savings and higher performance in the common use cases of one or two active subsystems. For these use scenarios, the active subsystems will have access to a potentially bigger on-chip local memory that can reduce the number of accesses to main memory and result in higher overall performance and lower power.

In a system in which a shared cache is available for SoC subsystems, a portion of the system cache is partitioned to be used exclusively for use by an assigned SoC master. There are several issues that arise in such systems. The master could be power collapsed at system runtime. In current systems the application processor subsystem (APSS) manages the entire shared cache. If the APSS is power collapsed, other masters are not able to execute cache management commands, such as deactivating or flushing a cache partition. Managing the system cache through the APSS also creates greater overhead using extra software interaction when managing the system cache.

SUMMARY

The methods and apparatuses of various aspects provide circuits and methods for implementing a cache maintenance or status operation for a component cache. Aspect methods may include storing a component cache indicator of a component cache such that the component cache indicator is accessible by a master of the component cache, issuing a cache maintenance or status command for the component cache by the master bypassing a centralized control entity, and receiving the cache maintenance or status command by a control register associated with a cache maintenance or status command and the component cache bypassing the centralized control entity.

In an aspect, storing a component cache indicator of a component cache such that the component cache indicator is accessible by a master of the component cache may include providing the master with a virtualized view of a control space for the component cache, and an aspect method may further include discovering features of the component cache by master by bypassing the centralized control entity.

An aspect method may further include assigning an address of the control register associated with the cache maintenance or status command and the component cache to the cache maintenance or status command, assigning data to the cache maintenance or status command, updating the control register associated with the cache maintenance or status command and the component cache with the data, and implementing a cache maintenance or status operation of the control register based on the data.

In an aspect, assigning data to the cache maintenance or status command may include assigning a memory virtual address of a cache memory as the data to the cache maintenance or status command.

An aspect method may further include determining whether the data of the cache maintenance or status command includes a memory virtual address of the cache memory, translating the memory virtual address of the cache memory to a memory physical address of the cache memory in response to determining that the data is a memory virtual address of the cache memory, and replacing the data with the memory physical address of the cache memory.

In an aspect, the data of the cache maintenance or status command may include at least one cache set and at least one cache way. In an aspect, the address of the control register may be a virtual address of the control register, and an aspect method may further include translating the virtual address of the control register to a physical address of the control register.

An aspect method may further include generating a component cache configuration table by the centralized control entity, assigning at least one component cache indicator to the master by the centralized control entity, mapping at least one control register to the component cache indicator by the centralized control entity, and concurrently directly accessing a plurality of control registers by a plurality of masters. In such an aspect, issuing a cache maintenance or status command for the component cache by the master bypassing a centralized control entity may include concurrently issuing a plurality of cache maintenance or status commands for a plurality of component caches by the plurality of masters bypassing the centralized control entity, and receiving the cache maintenance or status command by a control register associated with a cache maintenance or status command and the component cache bypassing the centralized control entity may include concurrently receiving the plurality of cache maintenance or status commands by the plurality of control registers associated with the plurality of cache maintenance or status commands and the plurality of component caches bypassing the centralized control entity.

An aspect includes a computing device having a processor, a cache memory configured to provide fast access for storing and retrieving data communicatively connected to the processor, a system cache controller communicatively connected to the processor, the cache memory, and the plurality of control registers, a centralized control entity communicatively connected to the processor and the system cache controller, a control register communicatively connected to the system cache controller and the processor and assigned to the processor for implementing a cache maintenance or status command for a component cache of the cache memory. In such aspects, the processor may be configured to be a master of the component cache and configured with processor-executable instructions to perform operations of one or more aspect methods described above, and the system cache controller may be configured to perform operations of one or more of the aspect methods described above.

An aspect includes a computing device having means for performing functions of one or more of the aspect methods described above.

An aspect includes a non-transitory processor-readable medium having stored thereon processor-executable software instructions to cause a processor to perform operations of one or more of the aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

FIG. 5 is a schematic diagram illustrating an example component cache configuration table in accordance with an aspect.

DETAILED DESCRIPTION

Figure 1:
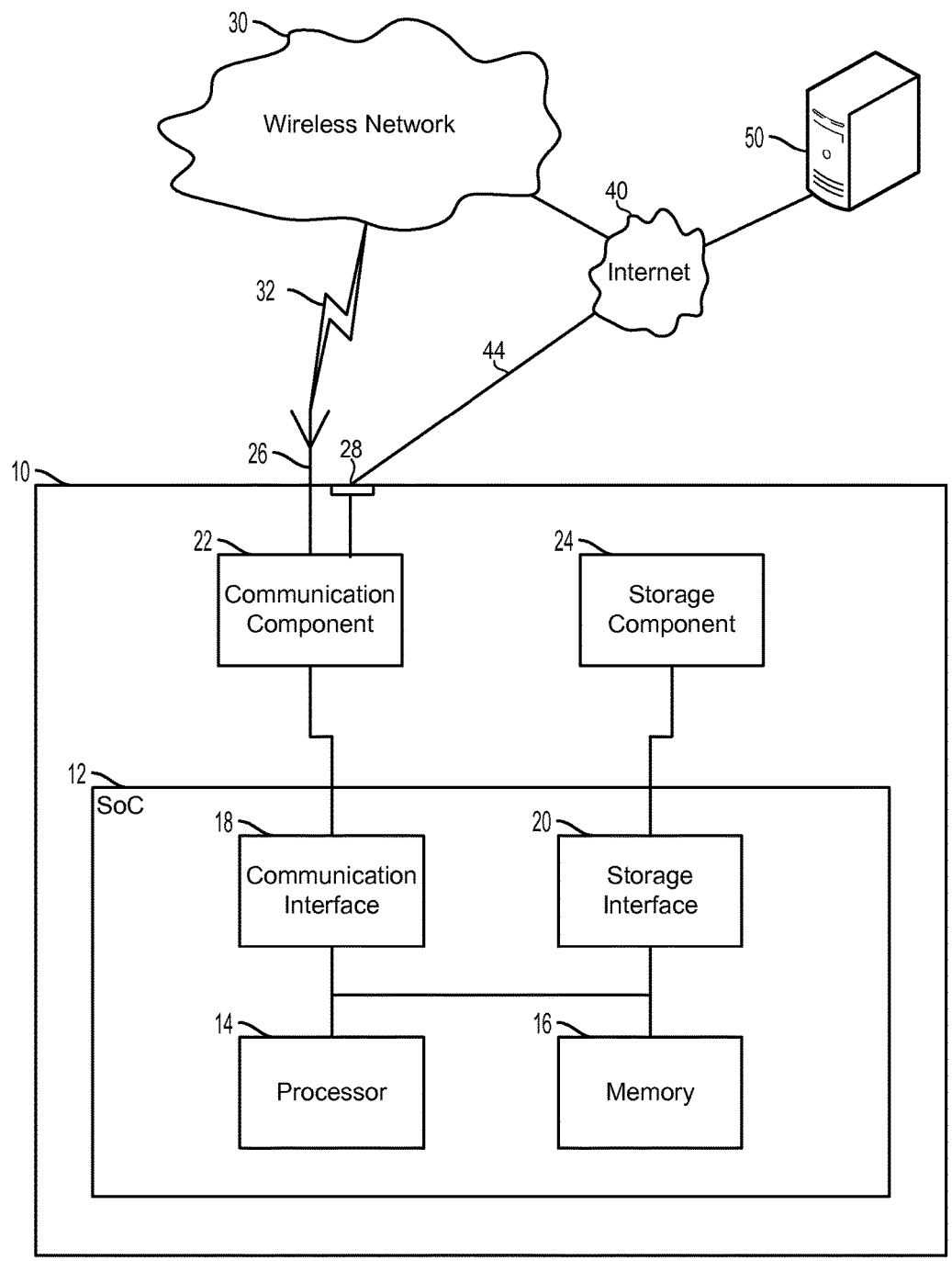
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a programmable processor. While the various aspects are particularly useful for mobile computing devices, such as smartphones, which have limited energy resources, the aspects are generally useful in any electronic device that implements a plurality of memory devices and a limited energy budget where reducing the power consumption of the memory devices can extend the battery-operating time of the mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

In an aspect, methods and apparatuses for virtualized control of a shared system cache allow for implementation of system cache operation when centralized control entity, such as an application processor subsystem (APSS) CPU, is power collapsed or active. Typically the centralized control entity is involved in the control of the shared system cache. When the centralized control entity is power collapsed, control of the shared system cache is interrupted. Even when the centralized control entity is active, going through a centralized control entity communication sequence could introduce latency and generate undesirable overhead, which are not ideal for circumstances that require fast response. The methods and apparatuses may implement a virtualized system that may provide for direct access for individual SoC masters to control the system cache without going through, or bypassing, the centralized control entity. The system cache may be virtualized to provide to each master a virtualized view of the portions of the system cache owned by the master. Cache maintenance operations may be implemented directly by masters of component caches (cache partitions or sub-caches) of the system cache in the virtualized system in which the masters of the component caches are only aware of the virtual addresses of their component caches.

The system employing a shared cache may include the centralized entity, such as the APSS CPU, with a view of all of the subsystems or components of the system that may be masters of respective component caches of the shared system cache. This centralized entity may include a hypervisor that may initialize a component cache configuration table that correlates each of the subsystems or components with respective component caches using system component caches identifiers provided to each subsystem or component. The component cache configuration table may be maintained in hardware, such as registers within a system cache control space, and the component cache identifiers (CCIDs) may be retained by their respective subsystems or components. The hypervisor may remain in control of the component cache configuration table, but by providing the component caches identifiers to their respective subsystems or components, the subsystems or components may make direct cache maintenance and status commands to hardware, such as control registers in the system cache control space, corresponding to the component cache identifiers. In this manner, cache maintenance and status commands may be implemented for the component caches of the system cache bypassing—or without relying on—the centralized entity, like the APSS CPU running the hypervisor. Should the APSS CPU be power collapsed, the subsystem or component masters may still make direct commands to the component caches using their component cache identifiers via the registers within the system cache control space.

Each subsystem or component master assigned one or more component cache identifiers may have access to a virtualized view of its respective component caches. The virtualized view may include a number of control registers and status registers associated with each component cache. The control registers may implement different functions for and store data relating to all or a portion of their respective component caches. The control registers may be assigned for different portions of the component caches based on a granularity for control by the memory management units of the subsystems or components. The status registers may provide a virtualized capacity and an error indication of their respective component caches.

The subsystem or component master may only be aware of its respective component caches. The cache maintenance operations may be implemented according to designated component cache parameters (e.g., sets and/or ways) and/or system cache address. Since the subsystem or component masters only know the virtualized version of their component caches, the data associated with the cache maintenance commands may include a virtual address of the component caches that may be translated to a physical address of the system cache to implement the command. The virtualized view of the component caches provides virtual ownership of the various component caches to various masters, such that the masters may directly access the related component cache control and status registers concurrent with (including simultaneous with) direct access by other masters, without synchronizing direct accesses between the masters. As used herein, references to operations being performed "concurrently" encompass operations that occur simultaneously as well as two or more operations that overlap at least partially in time.

FIG. 1 illustrates a system including a computing device 10 in communication with a remote computing 50 suitable for use with the various aspects. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 or connecting to a wired connection 44 to the Internet 40. The processor 14 may include any of a variety of hardware cores, as well as a number of processor cores. The SoC 12 may include one or more processors 14. The computing device 10 may include more than SoCs 12, thereby increasing the number of processors 14 and processor cores. The computing device 10 may also include processor cores 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together as part of one or more subsystems of the computing device 10 as described below with reference to FIG. 3.

The memory 16 of the SoC 12 may be a volatile or non-volatile memory configured for storing data and processor-executable code for access by the processor 14. In an aspect, one or more memories 16 may include volatile memories such as random access memory (RAM) or main memory, cache memory, or hardware registers. These memories 16 may be configured to temporarily hold a limited amount of data and/or processor-executable code instructions that is requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory. In an aspect, the memory 16 may be configured to store data structures at least temporarily, such as a table for managing component caches of a partitioned cache memory. In an aspect, the memory 16 may be configured to store data for implementing cache maintenance operations. As discussed in further detail below, each of the processor cores may access a variety of component caches of a cache memory.

The computing device 10 and/or SoC 12 may include one or more memories 16 configured for various purposes. In an aspect, one or more memories 16 may be configured to be dedicated to storing the data structures for storing component cache information in a manner that enables the data structure information to be accessed for managing component cache access requests and cache maintenance operations. When the memory 16 storing the data structures is non-volatile, the memory 16 may retain the information of the data structures even after the power of the computing device 10 has been shut off. When the power is turned back on and the computing device 10 reboots, the information of the data structures stored in non-volatile memory 16 may be available to the computing device 10.

The communication interface 18, communication component 22, antenna 26 and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage interface 20 and the storage component 24 may work in unison to allow the computing device 10 to store data on a non-volatile storage medium. The storage component 24 may be configured much like an aspect of the memory 16 in which the storage component 24 may store the data structures, such that the data structures information may be accessed by one or more processors 14. The storage component 24, being non-volatile, may retain the data structures information even after the power of the computing device 10 has been shut off. When the power is turned back on and the computing device 10 reboots, the data structures information store on the storage component 24 may be available to the computing device 10. The storage interface 20 may control access to the storage device 24 and allow the processor 14 to read data from and write data to the storage device 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
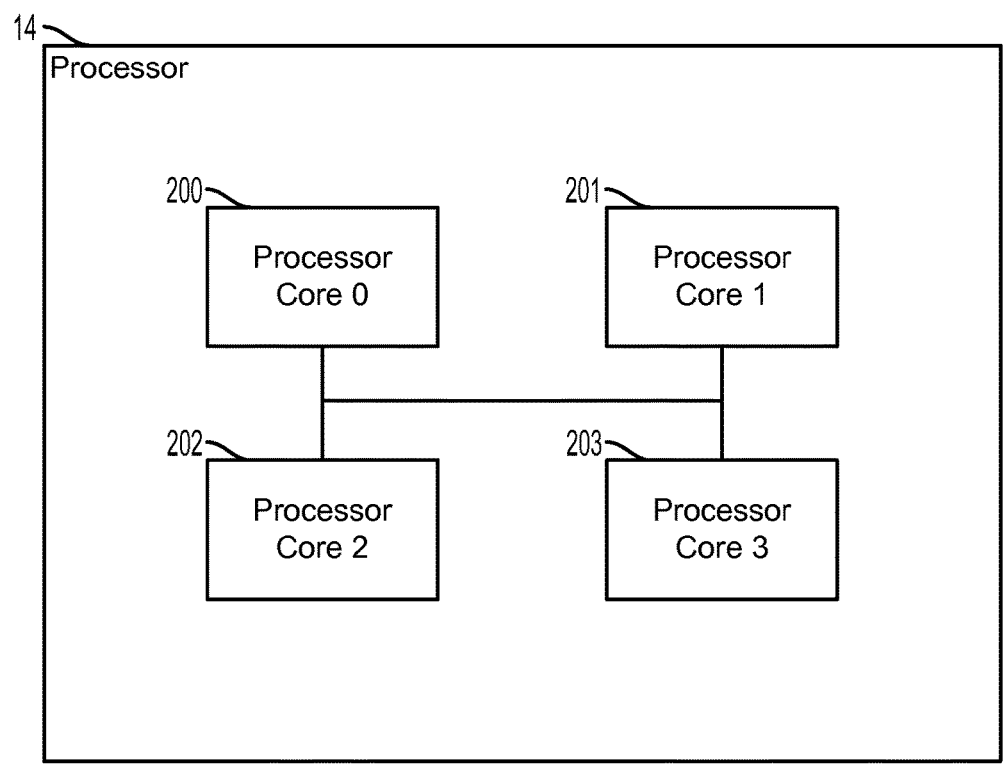
FIG. 2 is a component block diagram illustrating an example multi-core processor suitable for implementing an aspect.

FIG. 2 illustrates a multi-core processor 14 suitable for implementing an aspect. With reference to FIG. 1, the multi-core processor 14 may have a plurality of equivalent processor cores 200, 201, 202, 203. The processor cores 200, 201, 202, 203 may be equivalent in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be equivalent general purpose processor cores. Alternatively, the processor 14 may be a graphics processing unit or a digital signal processor, and the processor cores 200, 201, 202, 203 may be equivalent graphics processor cores or digital signal processor cores, respectively. Through variations in the manufacturing process and materials, the performance characteristics of the processor cores 200, 201, 202, 203 may differ from processor core to processor core within the same multi-core processor 14 or within another multi-core processor 14 using the same designed processor cores. In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, it should be noted that the four processor cores 200, 201, 202, 203 illustrated in FIG. 2 and described herein are merely provided as an example and in no way are meant to be limiting. The computing device 10, the SoC 12, or the multi-core processor 14 may individually or in combination include fewer or more than the four processor cores 200, 201, 202, 203 illustrated and described herein.

Figure 3:
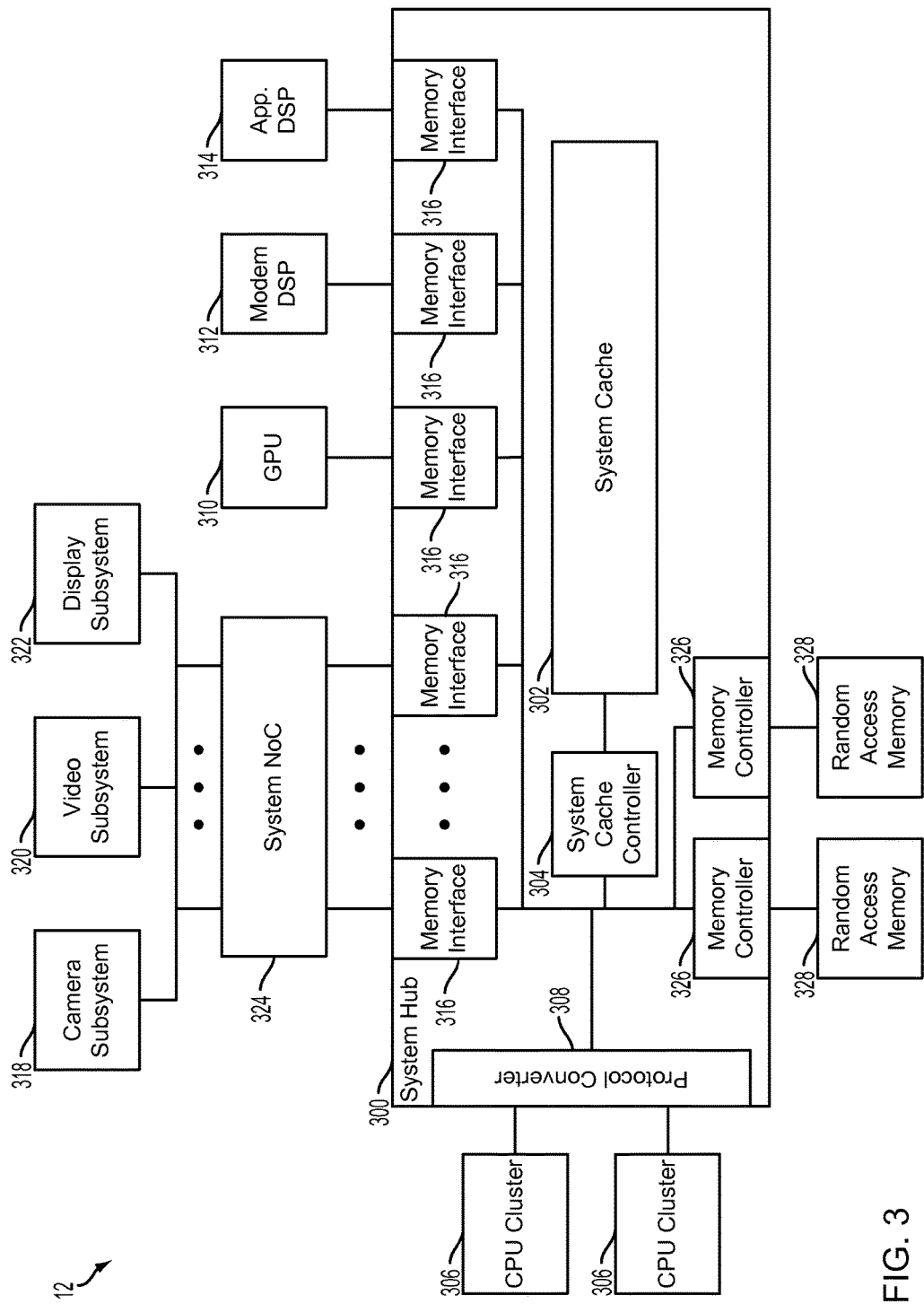
FIG. 3 is a component block diagram illustrating a computing device suitable for partitioning cache memory by sets and ways into component caches in accordance with an aspect.

FIG. 3 illustrates a computing device configured to partition a system cache memory into component caches. With reference to FIGS. 1 and 2, the SoC 12 may include a variety of components as described above. Some such components and additional components may be employed to implement the component caches. For example, an SoC 12 configured to implement component caches may include a system hub 300, a system cache 302, a system cache controller 304, a CPU cluster 306, a protocol converter 308, a GPU 310, a modem DSP 312, an application DSP 314, a memory interface 316, a camera subsystem 318, a video subsystem 320, a display subsystem 322, a system network on chip (NoC) 324, a memory controller 326, and a random access memory (RAM) 328. The system hub 300 may be a component of the SoC 12 that manages access to and maintenance of the various memories by the various processors 306, 310, 312, 314. In an aspect the system hub 300 may manage accesses to and maintenance of the system cache 302 of the SoC 12 and also accesses to the RAM 328. Some of the processors that may access the various memories may be included in the CPU clusters 306 and the various subsystems, such as the camera, video, and display subsystems 318, 320, 322, and may also include other specialized processors such as the GPU 310, the modem DSP 312, and the application DSP 314.

The system cache 302 may be a shared memory device in the SoC 12 used to replace or supplement cache memories that may be associated with the various processors and/or subsystems. The system cache 302 may centralize the cache memory resources of the SoC 12 so that the various processors and subsystems may access the system cache 302 to read and write program commands and data designated for repeated and/or quick access. The system cache 302 may store data from the various processors and subsystems, and also from other memory devices of the computing device, such as main memory, the RAM 328, and the storage device (e.g., a hard disk drive). In an aspect, the system cache 302 may be backed up by such memory and storage devices in case a cache miss occurs because an item requested from the system cache 302 cannot be located. In an aspect, the system cache 302 may be used as scratchpad memory for the various processors and subsystems. The system cache 302 may be smaller in storage space and physical size than a combination of the local cache memories of an SoC of similar architecture that does not employ a system cache 302. However, management of the system cache 302 as described further herein may allow for greater energy conservation and equal or better performance speed of the SoC 12 despite of the system cache's smaller storage space and physical size, and may allow for use of a simple software call flow.

The system cache controller 304 may manage access to and maintenance of the system cache 302 by the various processors and subsystems. Part of the access management of the system cache 302 may include managing the partitions the system cache memory space. The system cache memory space may be partitioned in a variety of manners, including, but not limited to, by cache words, cache lines, cache pages, cache ways, cache sets, cache banks, a partition indication field in a cache tag, or a combination of these parameters. Aspects of cache memory space partitioning by ways and sets are described in U.S. patent application Ser. No. 14/333,981 filed on Jul. 17, 2014, entitled "Method And Apparatus For Flexible Cache Partitioning By Sets And Ways Into Component Caches", which is hereby incorporated by reference for details regarding cache memory space partitioning by ways and sets. Partitioning the system cache memory space may result in component caches of various sizes and locations in the system cache memory space. The system cache controller 304 may include hardware, such as a number of registers (shown in FIGS. 7 and 8), configured to maintain records of these component caches and relate various traits/features/parameters to each of the component caches as described further with reference to FIGS. 5, 7, and 8. The registers may also be configured to implement cache maintenance operations for respective component caches as described further with reference to FIGS. 7-13.

The system cache controller 304 may receive system cache access requests specifying particular component caches. The system cache access requests may also include traits of the component cache of the system cache access requests. In an aspect, the traits of the component cache may be received separately in a component cache configuration request, on the same or on a different communication bus, by the system cache controller 304. The component cache configuration request may be a standalone signal or may be associated with a system cache access request. The component cache configuration request may be received by the system cache controller 304 as a component of a system cache access request. For ease of explanation, the following examples are described in terms of the component cache traits being received as part of the system cache access request, which is not meant to limit the manner by which the system cache controller 304 may receive the component cache traits. It should be understood that the component cache traits may be received via various associated or independent signals.

The system cache controller 304 may use the information of the specified component cache and the related traits to control access to, update and/or create, and reserve the component cache and its related records. In an aspect, the system cache controller 304 may dynamically partition the system cache memory space into component caches based on system cache access requests from masters of the system cache 302. Aspects of dynamically partition the system cache memory space into component caches are described in U.S. patent application Ser. No. 14/334,010 filed on Jul. 17, 2014, entitled "Method And Apparatus For A Shared Cache With Dynamic Partitioning", which is hereby incorporated by reference for details regarding dynamically partition the system cache memory space into component caches. The masters may include the various processors and subsystems of the SoC 12.

The control registers of the system cache controller 304 may be configured to manage cache maintenance and status commands/operations for the component caches. The control registers may be assigned to a particular component cache identified by a component cache identifier and provide a virtualized view of the component cache to its master, such as one of the various processors and subsystems. The hardware may be configured to implement different functions for and store data relating to all or a portion of the component cache. The master of the component cache may make cache maintenance and status commands using a component cache identifier to the control registers assigned to the component cache. These and other aspects of the system cache controller 304 are described further with reference to FIGS. 5 and 7-13.

The CPU clusters 306 may include groupings of several general purpose processors and/or general purpose processor cores. The CPU clusters 306 may access and maintain the system cache 302 via the system cache controller 304. Communications between the CPU clusters 306 and the system cache controller 304 may be converted by a protocol converter 308 from a standard or proprietary protocol of one of the CPU clusters 306 and the system cache controller 304 to a protocol suitable for the other in order to achieve interoperability between them. The CPU clusters 306 may send system cache access requests and cache maintenance and status commands specifying a particular component cache and/or traits of the specified component cache to the system cache controller 304. In return, the system cache controller may update and/or create the records of the specified component cache, allow or deny access to the specified component cache, return the information stored in the specified component cache to the CPU clusters 306, and implement the cache maintenance and status commands.

Similar to the CPU clusters 306, specialized processors, like the GPU 310, the modem DSP 312, and the application DSP 314, may access and maintain the system cache 302 via the system cache controller 304. Communications between the specialized processors 310, 312, 314, and the system cache controller 304 may be managed by dedicated, individual memory interfaces 316. In an aspect memory interfaces 316 may manage communications between multiple similar or disparate specialized processors 310, 312, 314, and the system cache controller 304.

Various subsystems, like the camera subsystem 318, the video subsystem 320, and the display subsystem 322, may similarly access and maintain the system cache 302 via the system cache controller 304 and memory interfaces 316. The NoC 324 may manage the communication traffic between the subsystems 318, 320, 322, and the system hub 300 as well as other components of the SoC 12.

The system cache controller 304 may also manage accesses to the RAM 328 by the various processors and subsystems of the SoC 12. While the various processors and subsystems may make direct access requests to the RAM 328 via the memory controller 326, in certain instances system cache access requests may be directed to the RAM 328. In an aspect, system cache access requests may result in cache misses when the information requested from a specified component cache is not found in the specified component cache. As a result, the system cache controller 304 may direct the system cache access requests to the RAM 328 to retrieve the requested information not found in the component cache. In an aspect, the request for the information directed to the RAM 328 may be directed first to the memory controller 326 that may control access to the RAM 328. The request for the information directed to the RAM 328 may be sent by the system cache controller 304, and the resulting information may be returned to the system cache controller 304 to be written to the component cache and returned from the component cache to the components making the system cache access requests. In an aspect, the resulting information may be returned directly, or via the system cache controller 304, to the components making the system cache access requests without being written to the component cache.

In some aspects, portions of the cache memory controller 304 may be implemented and configured in hardware and/or firmware to perform operations of the aspect methods. In some aspects, the cache memory controller 304 may be a programmable controller that is configured by controller-executable instructions to perform operations of the aspect methods. In some aspects, the cache memory controller 304 may be implemented and configured through a combination of firmware and controller-executable instructions to perform operations of the aspect methods.

The descriptions herein of SoC 12 and its various components are only meant to be exemplary and in no way limiting. Several of the components of the SoC 12 may be variably configured, combined, and separated. Several of the components may be included in greater or fewer numbers, and may be located and connected differently within the SoC 12 or separate from the SoC 12. Similarly, numerous other components, such as other memories, processors, subsystems, interfaces, and controllers, may be included in the SoC 12 and in communication with the system cache controller 304 in order to access the system cache 302.

Figure 4:
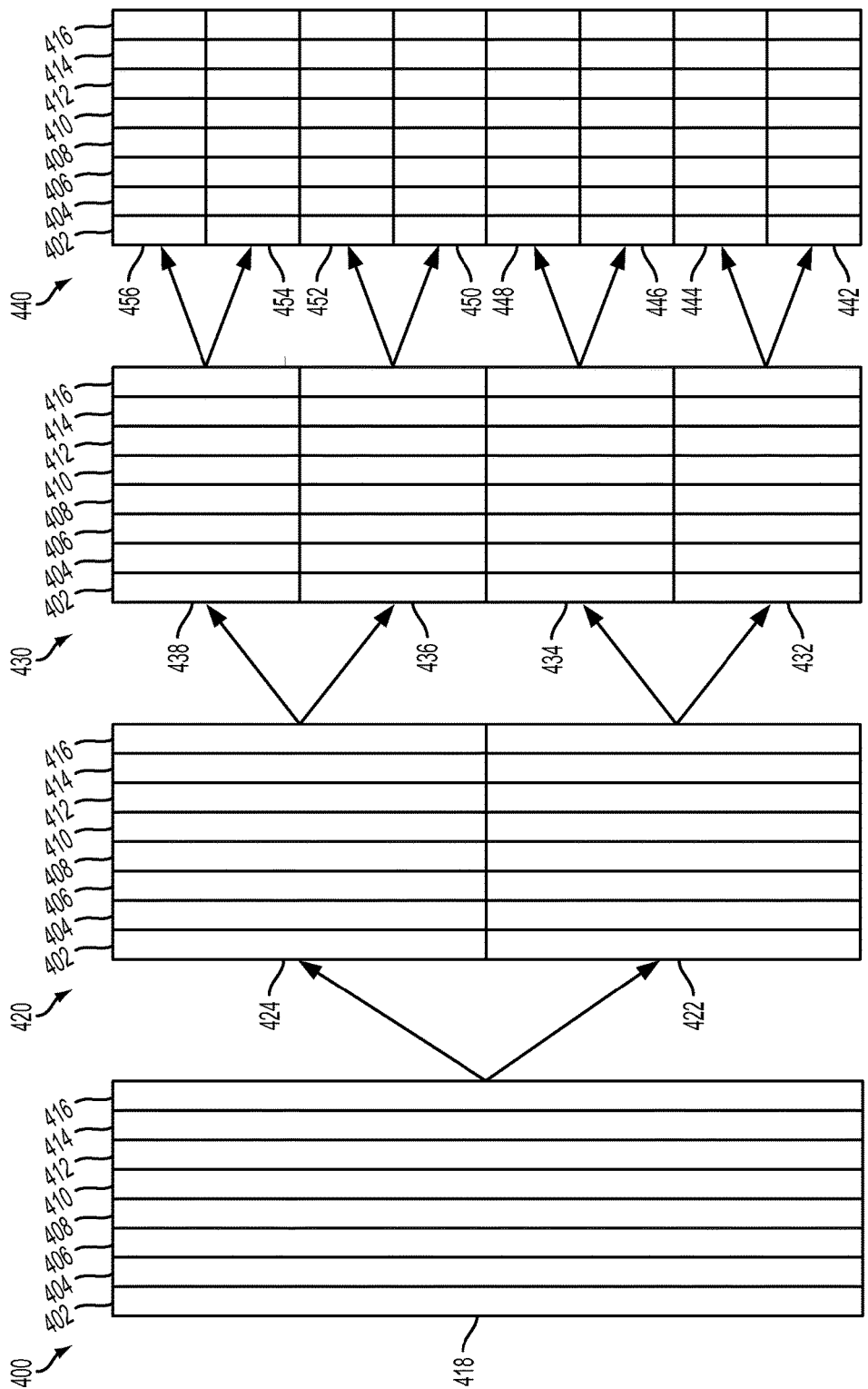
FIG. 4 is a schematic diagram illustrating an example cache memory variably partitioned by sets and ways to allow for component caches in accordance with an aspect.

FIG. 4 illustrates a system cache memory variably partitioned by sets and/or ways to allow for component caches. A system cache 400, such as the system cache described in FIG. 3 above, may be configured to include a number of ways 402, 404, 406, 408, 410, 412, 414, 416, and an N number of sets 418 where N is a positive integer. It is known to divide the system cache 400 by the ways 402-416 to create component caches. In this example, the system cache 400 includes eight ways 402-416, and dividing the system cache 400 by each of the eight ways 402-416 would result in a partitioned system cache 400 having eight partitions, each including one way 402-416 and all of the N sets 418 of the respective way 402-416. In an aspect, the system cache 400 may be partitioned using groups of ways 402-416 as well. Continuing with the example of the system cache 400 having eight ways 402-416, each partition may include two of the ways 402-416 resulting in four partitions, or four of the ways 402-416 resulting in two partitions.

The system cache 400 may be additionally partitioned by a defined group of the N number of sets to create component caches. In an aspect, a trait of the component caches used by the system cache controller may determine into how many set groups into which the N number of sets may be partitioned. In an aspect, this trait may be referred to as a set shift. For example, the system cache 400 is not partitioned into set groups, thus the set shift may be a value indicating no partitioning by set groups, such as a null value or zero. In another example, system cache 420 may be partitioned into two set groups 422, 424. The system cache 420 is the same system cache as the system cache 400, but the system cache 420 illustrates the system cache 400 when the set shift is a value indicating partitioning by two set groups 422, 424. For system cache 420, the system cache controller may manage the use of the system cache memory space using the extra component caches created by the partition of the system cache 420 by the two set groups 422, 424. The component caches may include partitions of the system cache 420 created by any combination of way partitions and the set group partitions, as described in further detail herein.

Similarly, the system cache 430 may be the same as the system cache 400, except that the system cache 430 illustrates the system cache 400 when the set shift is a value indicating partitioning by four set groups 432, 434, 436, 438. Similarly, system cache 440 illustrates the system cache 400 when the set shift is a value indicating partitioning by eight set groups 442, 444, 446, 448, 450, 452, 454, 456. In each of these example system caches 430 and 440 illustrated in FIG. 4, the system cache controller may manage the use of the system cache memory space using the extra component caches created by partitioning the system caches 430, 440 by the four set groups 432, 434, 436, 438 or the eight set groups 442-456. The component caches in these examples may include partitions of the system caches 430, 440, created by any combination of way partitions, the set group partitions, or other means of partitioning, as described in further detail herein.

Various forms of notation may be used to indicate the set shift, such as integers. In an aspect, the set shift trait indicating the number of set groups by which the system cache memory space is partitioned may indicate an incremental change in the number of set groups. For example, a change in the set shift trait value to indicate the next higher change in the number of set groups may indicate the incremental change of adding, multiplying, exponentially increasing, or increasing by some other function the number of set groups. For the example in FIG. 4, the number of set groups is a power of two, where the power is the set shift trait. The set groups may be equal in size and the number of sets per set group may also be a power of 2. It is conceivable that the number of sets can be a power of another number, which may require some hardware to be differently configured (like division by a non power of 2 integer) to calculate a set index as described further below.

In an aspect, a trait of the component caches used by the system cache controller may determine the set groups 422, 424, 432, 434, 436, 438, 442, 444, 446, 448, 450, 452, 454, 456 in which the component caches are located. In an aspect, this trait may be referred to as a set offset. Various forms of notation may be used to indicate the set offset.

Continuing with the example set groups described herein, the total number of set groups described is 14, not counting the N number of sets 418. For this example, the set offset may be a three bit binary code in which no set offset is needed when no set groups are implemented. When two set groups are implemented, the set groups 422, 424 correlate with the set offset=000 and 100, respectively. When four set groups are implemented, the set groups 432, 434, 436, 438 may correlate with the set offset=000, 010, 100, and 110, respectively. Similarly, when eight set groups are implemented, the set groups 442-456 may correlate with the set offset=000, 001, 010, 011, 100, 101, 110, and 111, respectively.

The descriptions herein of the component caches created by partitioning the system cache by ways and/or sets are only meant to be exemplary and in no way limiting. For ease of explanation and merely as an example, the various aspects are described in terms of ways and/or sets. However, several other parameters may be used to create component caches, such as cache words, cache lines, cache pages, cache ways, cache sets, cache banks, or a combination of these parameters.

FIG. 5 illustrates a component cache configuration table 500 that may be used by the system cache controller to manage the traits of the various component caches. With reference to FIGS. 1-4, the component cache configuration table 500 may include a component cache identifier field 502, a validity indicator trait field 504, a set shift trait field 506, a set offset trait field 508, a target ways trait field 510, a probe always trait field 512, an index mode trait field 514, a replacement policy trait field 516, and a cache line size trait field 528. Each component cache of the system cache may be correlated with an individual component cache identifier as shown in the component cache identifier trait field 502.

The component cache identifier may be received by the system cache controller during a component cache configuration table generation sequence, or a system cache access request from a master on the SoC, and used by the system cache controller to match the system cache access request with the correct component cache and its traits. In an aspect, when a component cache identifier is received that does not exist in the component cache configuration table 500, the system cache controller may update the component cache configuration table 500 to include the received component cache identifier.

In an aspect, the received component cache identifier may exist in the component cache configuration table 500, but one or more of the other component cache traits correlated with the component cache identifier may not match the component cache traits received with the received component cache identifier. In such a circumstance, the system cache controller may update the component cache traits in the component cache configuration table 500 correlated with the component cache identifier using the received component cache traits. Various notations may be used to symbolize a value of the component cache identifier in the component cache identifier field 502.

Each component cache of the system cache may be correlated with a validity indicator, as shown in the validity indicator trait field 504, and may be used to indicate a valid entry for the correlated component cache in the component cache configuration table 500. For various situations, a record of a component cache may be marked as being valid or invalid, such as with a value or flag correlated to a valid or invalid condition (e.g., "0" or "1"). A system cache access request for a component cache identifier correlated with a valid identifier in the validity indicator trait field 504 may be allowed by the system cache controller. When the system cache access request for a component cache identifier correlated with an invalid identifier in the validity indicator trait field 504 is received, the system cache controller may treat the system cache access request as an error.

The set shift trait field 506 in the component cache configuration table 500 may be used to indicate the set shift trait as described above. As described above, the set shift identifies the number of set groups into which the system cache memory space is divided for each of the component caches correlated with the respective set shift value. For example, there may be numerous component caches made up of various combinations of set and/or way partitions for a set shift indicating only two set group partitions. For example, in FIG. 5, row 522 includes set shift=1, which in this example indicates two set group partitions. Row 522 represents just one of the component cache set and way partitions, including one value in the set offset trait field 508 and one value in the target ways trait field 510.

There may be numerous other combinations of the same value in the set offset trait field 508 with other values in the target ways trait field 510 correlated with the same value in the set shift trait field 506. Even more combinations are possible for the other value possible for the set offset trait field 508 representing the other of the two set group partitions indicated by set shift=1 in the set shift trait field 506. Similar examples include larger numbers of combinations of set and way partitions of the different component caches for other possible values in the set shift trait field 506.

In an aspect, known partitions of the system cache (i.e., the entire cache or way only cache partitions) may be included in the component cache configuration table 500. Whereas the component cache configuration table 500 was previously unnecessary for these known partitions because they do not include partitions of the system cache by sets, these known partitions may be included in the component cache configuration table 500. The known partitions of the system cache may be defined in the component cache configuration table 500 when the set shift trait field 506 includes set shift=0 or a null value, as in rows 518 and 526. This set shift value may indicate that the component cache associated with it is not portioned by sets. Component caches partitioned by sets may be associated with set shift values greater than zero. Various notations may be used to symbolize a value of the set shift in the component set shift trait field 506.

The set offset trait field 508 in the component cache configuration table 500 may be used to indicate the set offset trait that may indicate the set group in which the correlated component cache resides. As discussed above, the component cache is partly made of a set group partition in combination with a way partition. The set shift trait may identify the number of set group partitions and the set offset trait may indicate the particular set group within that number of set group petitions that contains the correlated component cache. As discussed above, each set group may be correlated with a specific set offset trait value to be represented in the component cache configuration table 500 in the set offset trait field 508. More specifically, in an aspect the combination of the set shift and the set offset may define the set group that contains the component cache because set offset values for one set shift value may overlap with set offset values for another set shift value. For example, every set shift may include a set offset=000, which may correlate to a first set group. This is because, for each set shift value indicating multiple set groups, there is at least a first set group. Thus, the set offset=000 for the set shift=1 may represent a different set group for set offset=000 for another set shift value. It is also possible to assign a unique set offset value to the various possible set groups. Various notations may be used to symbolize a value of the set offset in the component set offset trait field 508.

The target ways trait field 510 in the component cache configuration table 500 may be used to indicate a target ways trait that may indicate a way group partition in which the correlated component cache resides. Much like the set groups, way groups may include ways of the system cache memory space in which a component cache may reside. For any component cache, no matter the set shift or the set offset, the target ways may indicate any combination of single or consecutive ways of the system cache. The way group partition of a component cache may allow for customization of the associativity of the component cache, both statically and dynamically, at run time. In the component cache configuration table 500, all combinations of the target way values may be correlated with any combination of set shift and set offset values. The combination of the set shift, set offset, and target ways in the component cache configuration table 500 define for the system cache controller all of the possible components caches. In an aspect, the target ways trait values may be represented by a bit vector, where each bit in the vector represents an individual way of the system cache. In the component cache configuration table 500, the bit vector is represented in hexadecimal.

Returning to the example relating to row 522, the system cache represented in row 522 is the same as the system cache 420 in FIG. 4, having eight ways and two set groups. In this example, the target way trait field 510 contains a value of 0xF0, which may also be represented as a binary bit vector as 1111 0000. Thus, in this example, the component cache may reside in the four ways indicated by the "F" or by the "1" values, which correlate to the ways 402, 404, 406, and 410 of system cache 420 in FIG. 4. Various notations may be used to symbolize a value of the target ways in the target ways trait field 510.

The probe all ways trait field 512 in the component cache configuration table 500 may be used to indicate whether tags of all the ways of the system cache are looked up or probed for an access to the component cache. When the probe all ways trait indicates to probe all of the ways of the system cache, the probe of the component cache may not be limited by the target ways value. This may be the case in a dynamic component cache, which may be able to change sizes within its set group, i.e., change its target ways. Therefore, if the component cache grows or shrinks at different times, information stored in a way that is no longer part of the component cache may still be found in the same set group in the system cache. When a component cache is static, such that it does not vary the way group which the component cache occupies, the probe all ways trait field 512 may contain a null value or a value indicating that the probe all ways feature is not enabled for the correlated component cache. This may reduce power consumption by minimizing tag lookup and compare operations across all ways of the system cache.

The index mode trait field 514 in the component cache configuration table 500 may be used to indicate whether the correlated component cache may be indexed using a physical address in a physical indexing mode (PI), or a custom index in a custom indexing mode (CI). In an aspect, physical addressing may result in unpredictable and sometime excessive cache conflicts (depending on the memory allocation), thus the custom indexing mode may be used for accessing the component caches. Any form of custom index may be used. In an aspect, the custom index may include a virtual address index to ensure predictable conflict misses, such as according to a high level operating system memory allocation scheme. Another aspect may use a hash of the custom index with the virtual address most significant bits to minimize conflict misses. In the physical indexing mode the system cache controller may receive a physical address of the system cache as part of the system cache access request from the master, and use the received physical address of the system cache to translate it to a physical address of the component cache in the system cache. In the custom indexing mode the system cache controller may receive a physical address of the system cache and a custom index as part of the system cache access request from the master, and use the received physical address of the system cache and the received custom index to translate them to a physical address of the component cache in the system cache. An aspect process for translating the received physical address of the system cache and/or the received custom index to a physical address of the component cache in the system cache is described further herein.

The replacement policy trait field 516 in the component cache configuration table 500 may be used to indicate a replacement policy for the information stored in the correlated component cache. Some such replacement policies may include known replacement polices including most recently used, least recently used, first-in-first-out, last-in-first-out, and random replacement polices. Other known and proprietary replacement policies may be used for the information stored in the various component caches. A replacement policy may be customized for each component cache according to the replacement policy trait field 516.

The cache line size trait field 528 in the component cache configuration table 500 may be used to indicate a default or customized size of the cache lines for the correlated component cache. The default cache line size may be the standard cache line size of the system cache memory. In an aspect, the cache line size trait field 528 may be set to the default cache line size for some or all of the component caches when the corresponding component cache is created in the component cache configuration table 500. In an aspect, a null value may also indicate the default cache line size. In an aspect, the cache line size trait field 528 may be set to a custom cache line size that may be set from memory when a component cache is created in the component cache configuration table 500, or in association with a system cache access request. The custom cache line size may include the default cache line size when an indicated custom cache line size is the same as the default cache line size. In the example illustrated in FIG. 5, the component caches represented in rows 518-526 may include different values in the cache line size trait field 528. As illustrated, the values may be represented by a size value measured in units of digital information, such as bits, bytes, megabytes, and other variations. The values may also be represented in terms of the number of sets and or ways of the system cache memory the cache lines may span.

In an aspect, the cache line size may also be determined using the set shift trait field 506 and/or the target ways trait field 510. As described above, the set shift trait field 506 may indicate the number of sets of the system cache memory used in a component cache, and the target ways trait field 510 may indicate the ways of the system cache memory. The size of a cache line in a component cache may be dependent on the number of cache sets and/or ways making up the component cache. Thus, customizing the cache line size for a corresponding component cache may be achieved by setting the set shift trait field 506 and/or the target ways trait field 510.

In an aspect, the component cache configuration table 500 may be static, in that every possible component cache may be represented in the component cache configuration table 500 for at least the component cache identifier field 502, the set shift trait field 506, the set offset trait field 508, and the target ways trait field 510. The other fields 502, 512, 514, and 516 do not necessarily define a component cache, but represent traits of the component caches that may be static or variable. Thus, in a static cache configuration table 500, a row may exist for each combination of set shift, set offset, and target ways correlated with a component cache identifier. In the static cache configuration table 500, the other fields 502, 512, 514, and 516 may still be variable and allow for changes to their values.

In an aspect, the component cache configuration table 500 may be dynamic in that rows including various combinations of set shifts, set offsets, and target ways correlated with component cache identifiers may be added to and deleted from the component cache configuration table 500 during runtime. Similar to the static component cache configuration table 500, the other fields 502, 512, 514, and 516 do not necessarily define a component cache, and may be variable and allow for changes to their values.

Figure 6:
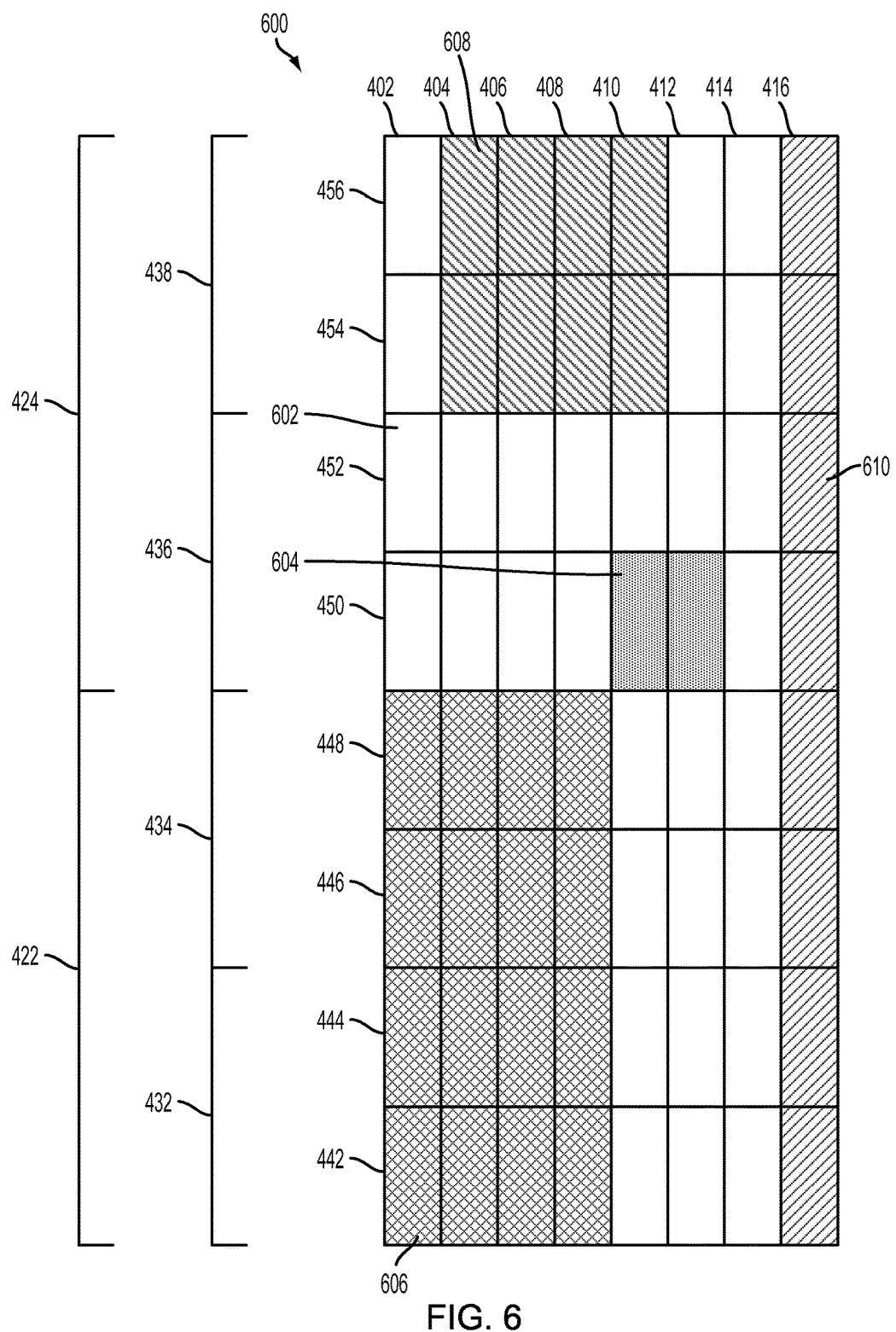
FIG. 6 is a schematic diagram illustrating an example system cache memory variably partitioned by sets and ways into component caches in accordance with an aspect.

FIG. 6 illustrates a system cache 600 variably partitioned by sets and ways into component caches. The component caches illustrated in FIG. 6 and described herein are only meant to be examples, and are in no way meant to be limiting. With reference to FIGS. 1-5, the component caches illustrated in FIG. 6 correlate with the non-limiting examples of the component caches illustrated in rows 518, 520, 522, 524, and 526 of FIG. 5. The component cache 602 correlates to the row 518 in the component cache configuration table 500. In this example, in row 518, the set shift value is null or zero. The set offset value is irrelevant because there are no set group partitions but may also be null or zero. The target ways include all of the ways 402-416 of the system cache 600 as indicated by the target ways=0xFF, which in a bit vector may be represented as 1111 1111, as described above.

In the example illustrated in FIG. 6, the component cache 604 correlates to the row 520 in the component cache configuration table 500. In this example, in row 520 the set shift=3 may represent that the system cache 600 is partitioned into eight set groups 442-456. The set offset=100 may represent that the component cache 604 is located in the set group 450. The target ways=0x0C, represented by the bit vector 0000 1100, may represent that the component cache 604 is located in the ways 410 and 412.

In the example illustrated in FIG. 6, the component cache 606 correlates to the row 522 in the component cache configuration table 500. In this example, in row 522 the set shift=1 may represent that the system cache 600 is partitioned into two set groups 422 and 424. The set offset=000 may represent that the component cache 604 is located in the set group 422. The target ways=0xF0, represented by the bit vector 1111 0000, may represent that the component cache 604 is located in the ways 402, 404, 406, and 408.

In the example illustrated in FIG. 6, the component cache 608 correlates to the row 524 in the component cache configuration table 500. In this example, in row 524 the set shift=2 may represent that the system cache 600 is partitioned into four set groups 432-438. The set offset=110 may represent that the component cache 604 is located in the set group 438. The target ways=0x78, represented by the bit vector 0111 1000, may represent that the component cache 604 is located in the ways 404, 406, 408, and 410.

In the example illustrated in FIG. 6, the component cache 610 correlates to the row 526 in the component cache configuration table 500. In this example, in row 526 the set shift value is null or zero. The set offset value is irrelevant because there are no set group partitions but may also be null or zero. The target ways include the way 416 of the system cache 600 as indicated by the target ways=0x01, which in a bit vector may be represented as 0000 0001.

FIG. 6 illustrates only a small sample of the potential component caches that may be managed by the system cache controller using the component cache configuration table 500 and the control registers. While the component caches 604, 606, 608, and 610 are illustrated in FIG. 6 as occupying non-overlapping locations in the system cache 600 (with the exception of component cache 602), this illustration is only for ease of explanation, and many of the component caches may overlap other component caches as they overlap the component cache 602. Not all component caches may be active at the same time, thus use of overlapping of component caches may be managed by the system cache controller as discussed further herein. The parameters of the different component caches may result in a different cache line size per component cache. As each component cache includes a partition of the entirety of the cache sets of the system cache, the cache line associated with each component cache may be less than all of the cache sets in a cache way. This may result in smaller cache lines than if not partitioned by cache sets, and the number of cache sets per component cache, defined by the set shift trait, may determine the cache line size per component cache.

In an aspect, the component caches may be activated and deactivated. Since there is a possibility of component caches overlapping in the memory space managed by the system cache, to avoid cache collisions, component caches overlapping active component caches may be deactivated. Also, to save power, component caches that are not in use may be deactivated. The component caches may be activated and deactivated at runtime, in part to dynamically partition a double data rate (DDR) memory space that is managed by/visible to the system cache and assign component caches to specified masters. Some of the masters of the system cache may only require the component caches for relatively short periods of time, and the system cache memory space being used by the component cache may be reserved for the master to avoid cache conflicts with other masters using or maintaining the system cache. Further, when a master is finished with a component cache, the component cache may be deactivated and the system cache space unreserved, making the system cache memory space and the component cache available to other masters.

Figure 7:
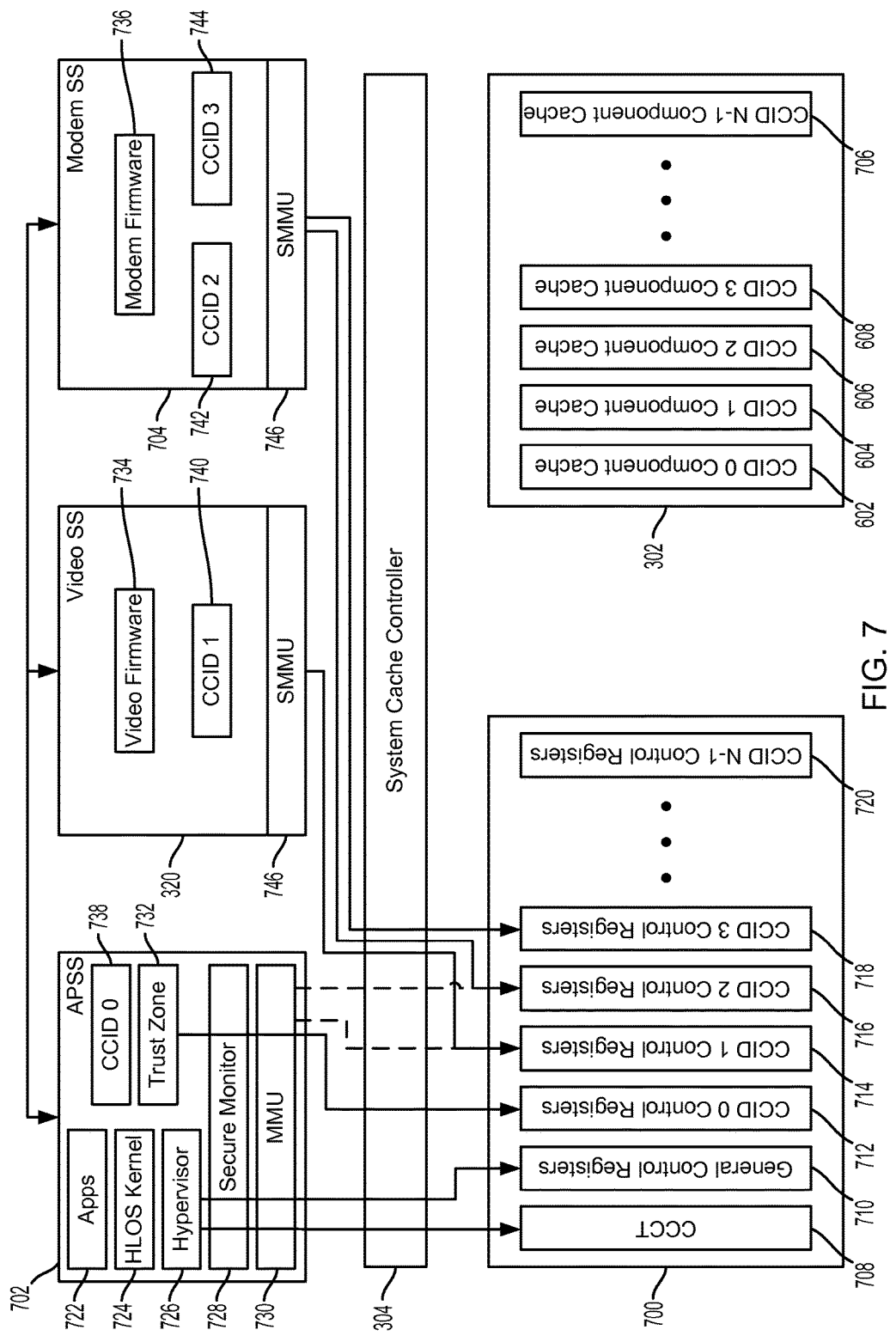
FIG. 7 is a schematic diagram illustrating examples of master component cache identifier assignment and cache maintenance operation direct access in accordance with an aspect.

FIG. 7 illustrates examples of master component cache identifier assignment and cache maintenance operation direct access in accordance with an aspect. With reference to FIGS. 1-6, the computing device may include a variety of processors and subsystems, such as an application subsystem 702, a video subsystem 320, and a modem subsystem 704. The processors and subsystems 320, 702, 704 may be in communications with the system cache 302 and a control space 700 via the system cache controller 304. One of the processors or subsystems, for example the application subsystem 702, may function as centralized control entity for managing component caches 602, 604, 606, 608, 706 of the system cache 302. The processors and subsystems 320, 702, 704 may each function as a master of one or more component caches 602, 604, 606, 608, 706, as described further below. In an aspect, the application subsystem 702 may setup the component caches in the system cache, and the control space 700 may provide a virtualized view of the component caches 602, 604, 606, 608, 706 to their masters 320, 702, 704 for performing cache maintenance and status commands/operations, for example a virtualized view of the cache capacity, and flushing the whole component cache.

In an aspect, the centralized control entity for managing component caches 602, 604, 606, 608, 706, the application subsystem 702 in this and other examples may have a view of all of the processors and subsystems that may access the system cache 302. During a boot sequence of the computing device, or during runtime, the application subsystem 702 may generate, load, or update the component cache configuration table, and write it to a designated group of component cache configuration table (CCCT) control registers 708 for storing the component cache configuration table. In an aspect, the application subsystem 702 may implement a hypervisor/virtual machine manager 726 to manage the interactions between the application subsystem 702 and the group of component cache configuration table control registers 708 for manipulating the component cache configuration table. The application subsystem 702, via the hypervisor 726, may also interact with a group of general control registers 710 for performing cache maintenance and status commands/operations for the system cache 302.

The application subsystem 702, via the hypervisor 726, may also assign groups of control registers 712-720 to respective masters of component caches 320, 702, 704 for performing cache maintenance and status commands/operations for the respective component caches 602, 604, 606, 608, 706. To assign the groups of control registers 712-720 to respective masters 320, 702, 704, the application subsystem 702 may indicate to a memory management unit 730, 746 virtual addresses for the groups of control registers 712-720 such that each master 320, 702, 704 has a mapping of the virtual address for each group of control registers 712-720. In an aspect, the memory management unit 730, 746 may not provide mapping of the group of control registers that is not related to its upstream master, and by doing so may prohibit the master from accessing the group of control registers correlated to other component caches that are not assigned to the upstream master, thereby preventing unintended intervention to an unassigned component cache 602, 604, 606, 608, 706. In an aspect, the application subsystem 702 may indicate to the memory management unit 730, 746 a correlation of the virtual address to physical addresses of each group of control registers 712-720. In an aspect, the indication of the correlation may be a one-to-one correlation of physical and virtual address, or an algorithm of determining the correlation.

In an aspect, the component caches 602, 604, 606, 608, 706 assigned to each group of control registers 712-720 may be identified by a respective component cache identifier, such as the component cache identifiers (CCID) of the component cache configuration table. As indicated in the example in FIG. 7, the control registers 712 (CCID 0 control registers) may correlate with the component cache 602 (CCID 0 component cache). Similarly, in the same example, the control registers 714 (CCID 1 control registers) may correlate with the component cache 604 (CCID 1 component cache), the control registers 716 (CCID 2 control registers) with the component cache 606 (CCID 2 component cache), and the control registers 718 (CCID 3 control registers) with the component cache 608 (CCID 3 component cache).

The application subsystem 702, via the hypervisor 726, may also assign the processors and subsystems 320, 702, 704 as masters of respective component caches 602, 604, 606, 608, 706 of the system cache 302. The application subsystem 702 may assign to the processors and subsystems 320, 702, 704 indicators 738-744 of the of respective component caches 602, 604, 606, 608, 706 for which they are masters. The processors and subsystems 320, 702, 704 may store the indicators 738-744 of the of respective component caches 602, 604, 606, 608, 706 for which they are master. The indicators 738-744 may include the component cache identifiers of the of respective component caches 602, 604, 606, 608, 706.

In an aspect, the indicators 738-744 may be used to locate the component cache configuration information in the component cache configuration table (CCCT) 708, and the correct group of control registers 712-720, which provide the masters 320, 702, 704 a virtualized view of the control space 700 for their respective component caches 602, 604, 606, 608, 706, such that they are blind to the control space 700 for the other component caches 602, 604, 606, 608, 706, or other parts of the system cache. The masters 320, 702, 704 may use the indicators 738-744 to discover the size, location, and other features of the respective component caches 602, 604, 606, 608, 706, such as the features of the component cache configuration table.

In an aspect, the cache maintenance and status commands may be issued by the masters 320, 702, 704 via the application subsystem 702. A master 320, 702, 704 may send a cache maintenance or status command to the application subsystem 702 for a component cache 602, 604, 606, 608, 706. Receiving the cache maintenance or status command, the application subsystem 702 may transmit the cache maintenance or status command to the group of control registers 712-720 correlated with the component cache 602, 604, 606, 608, 706 via a memory management unit 730 and the system cache controller 304. In another aspect, the cache maintenance and status commands may be issued by the masters 320, 702, 704 directly without going through the application subsystem 702, as described further below.

In an aspect, the memory management unit 730 may translate the virtual address associated with the component cache 602, 604, 606, 608, 706 of the cache maintenance or status command to a physical address of the to the group of control registers 712-720 correlated with the component cache 602, 604, 606, 608, 706. In this manner, the cache maintenance or status command may be directed to the appropriate group of control registers 712-720. The system cache controller 304 may control whether the cache maintenance or status command may be accepted for the appropriate group of control registers 712-720 and may write data to the appropriate group of control registers 712-720 to implement the cache maintenance or status command/operation for the component cache 602, 604, 606, 608, 706. In the example in FIG. 7, the cache maintenance or status commands issued by the application subsystem 702 on behalf of the masters 320, 702, 704 are indicated by the dashed lines.

In an aspect, the application subsystem 702 may implement a trust zone 732, or a secure operating environment, from which it may issue the cache maintenance or status commands to the control space 700. The trust zone 732 may issue cache maintenance or status commands to certain groups of control registers 712-720.

In an aspect, a call for execution of a processor or subsystem 320, 702, 704 may trigger a cache maintenance or status command by the processors and subsystems 320, 702, 704. The call may stem from the various applications 722, high level operating system (HLOS) kernels 724, or the hypervisor 726 executed by the application subsystem 702. In an aspect, the application subsystem 702 may be power collapsed and a processor or subsystem 320, 704 may be triggered by another component of the computing device. Whether the application subsystem 702 is powered up or power collapsed, the processor and subsystem 320, 704, as masters of respective component caches 604-608 having been provided with respective component cache indicators 740-744, have a virtualized view of the groups of control registers 714-718 associated with the component cache indicators 740-744.

Continuing with the example of FIG. 7, the video subsystem 320, assigned component cache indicator 740 (in this example CCID 1), has a virtualized view of the respective group of control registers 714 (in this example CCID 1 control registers). Similarly, the modem subsystem 704, assigned component cache indicators 742, 744 (in this example CCID 2 and CCID 3), has a virtualized view of the respective groups of control registers 716, 718 (in this example CCID 2 control registers and CCID 3 control registers). The processor or subsystem 320, 704 having a virtualized view of the respective group of control registers 714-718 may directly issue a cache maintenance and status command to the respective group of control registers 714-718. The cache maintenance and status command may be issued by a processor or component, such as a video firmware 734 or a mode firmware 738, of the processor or subsystem 320, 704 using the appropriate component cache indicator 740-744 to identify the target groups of component cache control registers 714-718.

In the example in FIG. 7, the cache maintenance or status commands directly issued by the processor and subsystem 320, 704 to the respective groups of control registers 714-718 as masters of the respective component caches 604-608 are indicated by the solid lines from the video subsystem 320 to the group of control registers 714, and from the modem subsystem 704 to the groups of control registers 716, 718. The virtualized view of the component caches 604-608 provides virtual ownership of the component caches 604-608 to the respective masters 320, 702, 704. Such virtual ownership may enable the masters 320, 702, 704 to directly access the respective groups of control registers 714-718 concurrent with (e.g., simultaneously with) direct access by other masters 320, 702, 704 without synchronizing direct accesses between the masters 320, 702, 704. As such, the masters 320, 702, 704 may concurrently (e.g., simultaneously) issue cache maintenance and status commands to the respective groups of control registers 714-718, and the respective groups of control registers 714-718 may concurrently (e.g., simultaneously) receive the cache maintenance and status commands.

Figure 8:
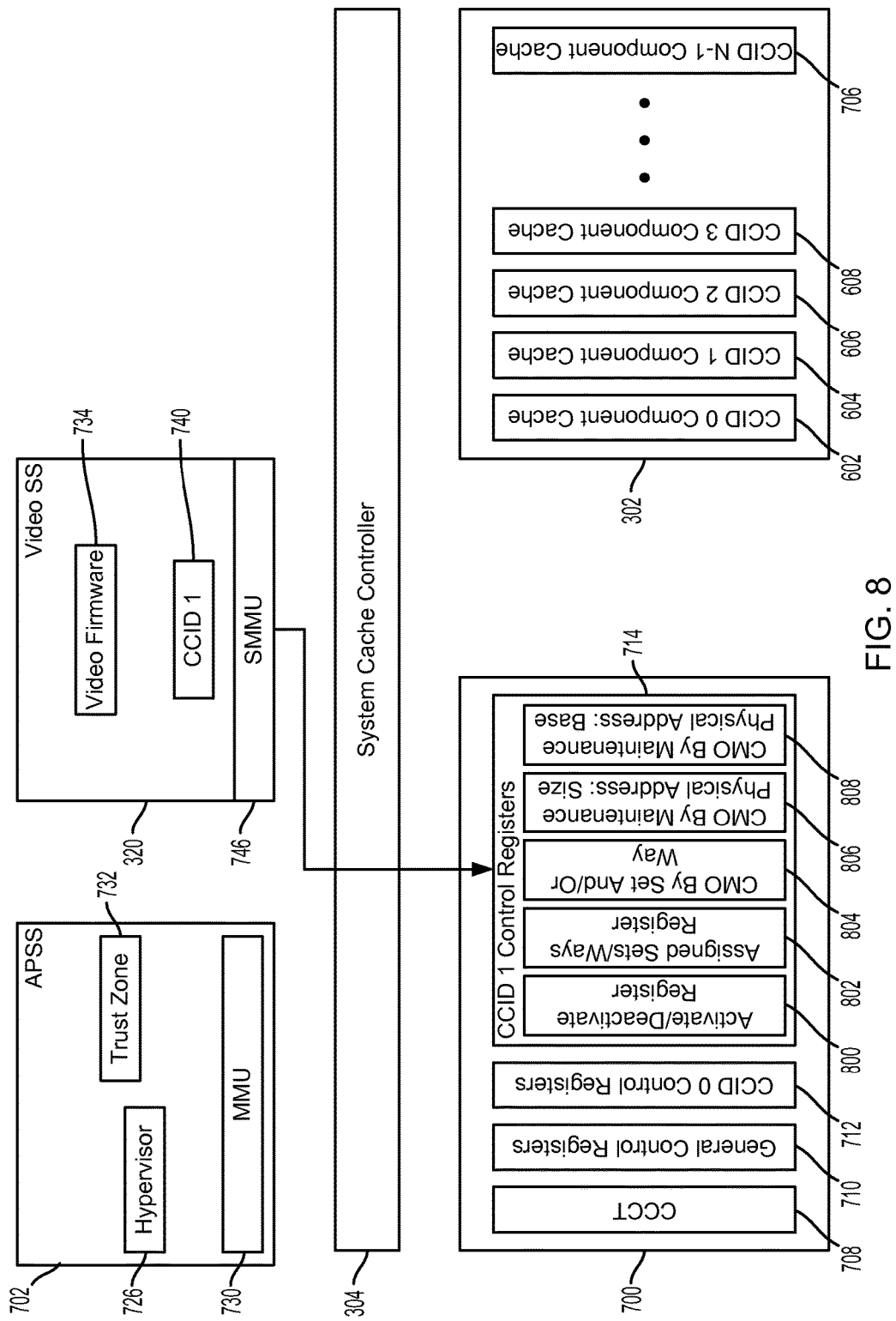
FIG. 8 is a schematic diagram illustrating examples of master cache maintenance operation direct access in accordance with an aspect.

FIG. 8 illustrates an example of master cache maintenance operation direct access in accordance with an aspect. With reference to FIGS. 1-7, the example in FIG. 8 show an aspect of the example in FIG. 7, such that the application subsystem 702 is power collapsed, and the video subsystem 320 directly issues a cache maintenance or status command to the group of control registers 714 (in this example CCID 1 control registers) associated with component cache 604 (in this example CCID 1 component cache) having been assigned the component cache indicator 740 (in this example CCID 1). Despite the application subsystem 702 being power collapsed, the video subsystem 320 retains the cache indicator 740 to which it is assigned, and the MMU 746 is still configured with the mapping to the control registers. By retaining the cache indicator 740, the video subsystem 320 retains a virtualized view of the group of control registers 714 even without communicating with the group of control registers 714 through the application subsystem 702, or in this example, the centralized control entity. Elements of FIG. 7 are omitted in FIG. 8 for simplicity of explanation. FIG. 8 also provides an example of the group of control registers 714 discussed in further detail below.

The control space 700 may include the various groups of control registers 708-720, as shown in FIG. 7. Each of the groups of control registers 712-720 may include control registers for implementing control and status commands/operations for their respective component caches 602, 604, 606, 608, 706. For ease of explanation, the example in FIG. 8 shows the control registers 800-808 for the group of control registers 714 correlated with the component cache 604, for which the video subsystem 320 is the master.

Each of the control registers 800-808 may be configured to implement a cache maintenance or status command/operation for its related component cache 604. The control registers 800-808 may include an activate/deactivate register 800, a current assigned sets/ways register 802, and cache maintenance operation registers 804-808. The activate/deactivate register 800 may be configured to activate and deactivate the component cache 604 for used by the master 320.

In an aspect, when the activate/deactivate register 800 is set to activate, for example by a bit flag=1, any overlapping component caches may be prevented from being activated by the system cache controller 304. The system cache controller 304 may allow writing an activate code to an activate/deactivate register when no overlapping component cache is active, or all activate/deactivate register of overlapping component caches are set to deactivate, for example by a bit flag=0. In an aspect, the component cache configuration table may include an overlap trait field storing a value that may indicate whether the related component cache may allow or prevent overlap with other component caches when the related component cache is active. In response to the overlap value indicating overlap is accepted, the system cache controller 304 may allow for activation of an overlapping component cache and manage the overlap of component caches using the replacement policy for the component caches in the component cache configuration table. In response to the overlap value indicating overlap is not accepted, the system cache controller 304 may prevent the activation of the overlapping component cache, and notify the master of the failure to active the component cache.

The target ways register 802 may be used to indicate certain ways of the component cache 604 for implementing a control or status command/operation. The cache maintenance operation registers 804-808 may represent a control register for implementing a certain cache maintenance operation for a designated potion of the component cache 604 based on an address or range of addresses within the component cache 604. For example, the cache maintenance operation registers 804-808 may be configured to implement a cache clean, cache invalidate, or cache clean and invalidate maintenance command.

The cache maintenance operation registers 804-808 may use different address types for indicating areas of the component cache 604 for implementing the cache maintenance operations. In an aspect, the cache maintenance operation register 804 may be configured to implement a cache maintenance operation for the component cache 604 at locations indicated by set and/or way of the system cache 302 which correlate to a portion of the component cache 604. The cache maintenance operation register 806 may be configured to implement a cache maintenance operation for the component cache 604 at locations indicated by a memory physical address and a size of the portion of the component cache 604. The cache maintenance operation register 808 may be configured to implement a cache maintenance operation for the component cache 604 at locations indicated by a memory virtual address and a base offset for the portion of the component cache 604. In an aspect, a cache maintenance operation registers may be configured to use a range of virtual addresses to implement a cache maintenance operation. The address types may reference to portions of the component cache 604 or varying size, which may include cache words, cache lines, cache pages, cache ways, cache sets, cache banks, or a combination of these parameters. The group of control registers 714 may include a separate cache maintenance operation register 804-808 for each combination of cache maintenance operation and addressing type.

The example in FIG. 8 represents a direct access of at least one of the control registers 800-808 by the video subsystem 320 as the master of the component cache 604. In an aspect, the access of the control registers 800-808 is direct because issuing cache maintenance or status command may be accomplished by bypassing, or without involving, the centralized control entity, such as the application subsystem 702. The video subsystem 320 may initiate and transmit a direct cache maintenance or status command. In an aspect, the direct cache maintenance or status command may include information of the relevant control registers 800-808 and the relevant component cache 604 retrieved, either from the indicator 740 or by using the indicator 740 to discover the information from the control space 700. The information of the relevant control registers 800-808 may include an address offset of the relevant control registers 800-808 based on the cache maintenance or status command being issued. For example, the virtual address for activate/deactivate register 800 may be used to direct an activate/deactivate command to the activate/deactivate register 800.

The virtual address of the cache maintenance or status command issued from the master 320 may be translated to a physical address for the relevant control register 800-808. In an aspect, the translation may be implemented by the system memory management unit 746, which may be loaded with a translation table or algorithm at the time the virtual addresses are determined for the control registers 800-808 when generating, loading, or updating the component cache configuration table. In an aspect, the system memory management unit 746 may be preloaded with a translation table or algorithm for converting virtual addresses of the control registers 800-808 to physical addresses. In the example of issuing the activate/deactivate command to the activate/deactivate register 800, the activate/deactivate command may also include data for writing to the activate/deactivate register 800, such as data for the bit flag described above, or other data that may more specifically indicate portions of the component cache 604 to activate or deactivate.

In an aspect, cache maintenance or status commands issued for indicating the target ways or a cache maintenance operation by cache set and/or ways may similarly involve retrieving the virtual address of the relevant control registers 800-808, for example, the target ways register 802 and the cache maintenance operation register 804, and translating the virtual address to the physical address of the relevant control registers 800-808. These cache maintenance or status commands may also involve retrieving the information of component cache 604. The cache maintenance or status commands issued for indicating the target ways or a cache maintenance operation by cache sets and/or ways may include data for writing to the target ways register 802 and the cache maintenance operation register 804 for indicating the portions of the component cache 604 to implement the cache maintenance or status commands/operations. In this example, the data may include an indication of the target ways or the cache set and/or ways for implementing the cache maintenance or status commands/operations.

In an aspect, cache maintenance or status commands issued for indicating a cache maintenance operation by a memory virtual address and a size or base offset of the portion of the relevant component cache 602, 604, 606, 608, 706 may similarly involve retrieving the virtual address of the relevant control registers 800-808, for example, the cache maintenance operation register 806, 808. Issuing the cache maintenance or status commands may also involve translating the virtual address to the physical address of the relevant control registers 800-808.

For cache maintenance or status commands identifying portions of the component cache 604 for implementing a cache maintenance or status command/operation, an extra address translation may be implemented to translate the data portion of the cache maintenance or status command, as described with reference to FIG. 15. The data portion may include the memory virtual address of the content within the component cache 604 for which the cache maintenance or status command/operation is to take effect. To implement the cache maintenance or status command/operation for the component cache 604, the cache maintenance operation registers 806, 808 may require the memory physical address of the request targeting the content within component cache 604. The memory virtual address translated as data of the cache maintenance or status command issued may be translated to a memory physical address for the component cache 604. In an aspect, the data translation may be implemented by the system memory management unit 746, which may be loaded with a data translation table or algorithm at the time the memory virtual addresses are determined for the component caches 602, 604, 606, 608, 706 when generating, loading, or updating the component cache configuration table. In an aspect, the system memory management unit 746 or the system cache controller 304 may be preloaded with a data translation table or algorithm for converting memory virtual addresses of the component caches 602, 604, 606, 608, 706 to memory physical addresses.

Figure 9:
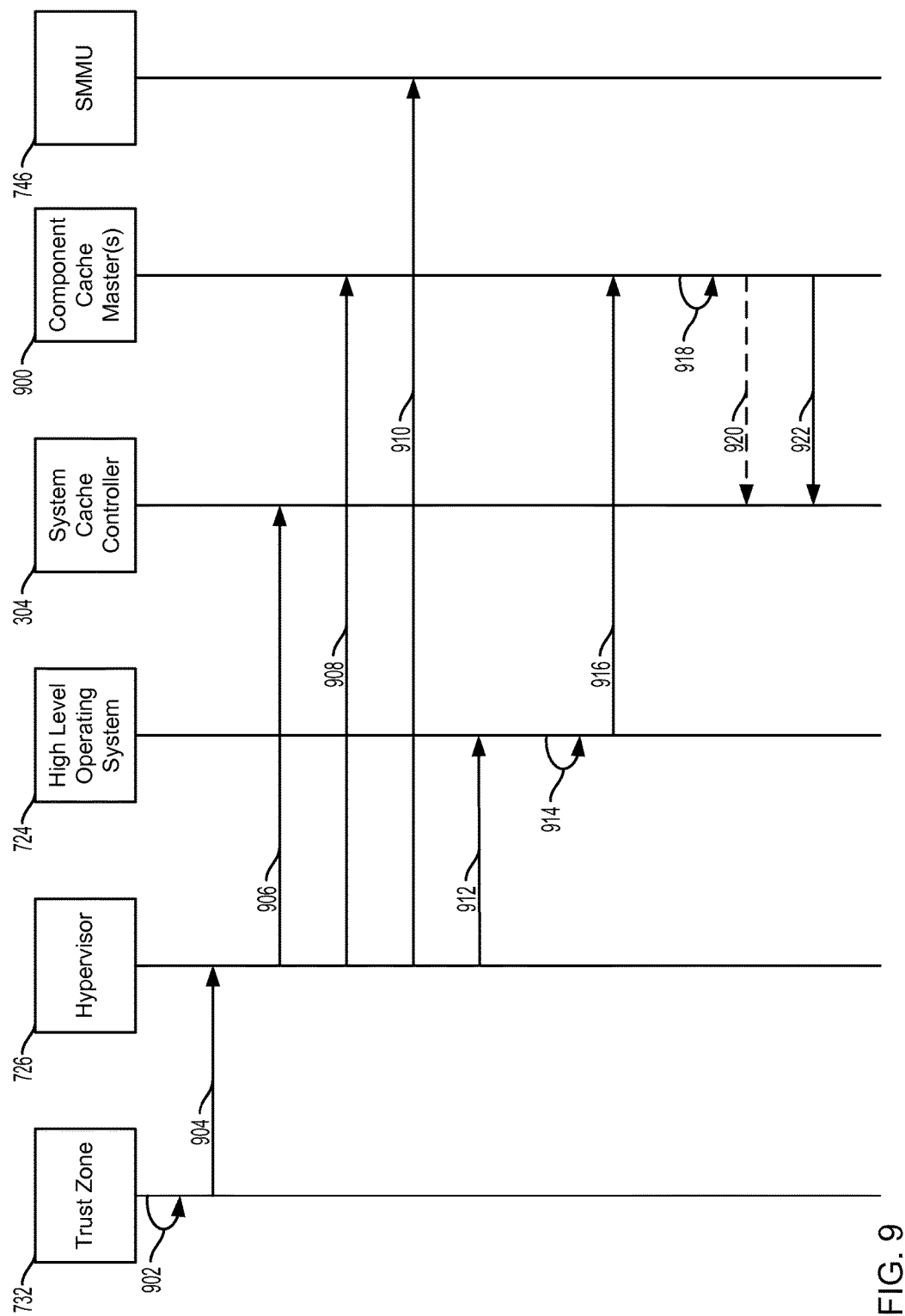
FIG. 9 is a schematic and process flow diagram illustrating an example of master component cache identifier assignment and cache maintenance operation direct access in accordance with an aspect.

FIG. 9 illustrates an example of master component cache identifier assignment and cache maintenance operation direct access in accordance with an aspect. With reference to FIGS. 1-8, in an aspect, the computing device may generate the component cache configuration table and assign the indicators of the component caches to the component cache masters as part of a boot sequence of the computing device. The computing device may boot 902 using a secure trust zone environment 732, to ensure that the boot process is secure from malicious code. The boot process may initiate the execution of the hypervisor 906 as a centralized control entity.

The hypervisor 726 may generate the component cache configuration table 906 in the system cache controller 304. In an aspect, the component cache configuration table may be generated based on program instructions provided to the computing device for partitioning the system cache memory. In an aspect, the component cache configuration table may be generated based on information retrieved from storage of a pervious configuration of the component cache configuration table.

The hypervisor 726 may provide each of the component cache masters with at least one indicator for a respective component cache 908. In an aspect, the component cache masters 900 may include the processor and subsystems described with reference to FIGS. 1-3, 7, and 8. The indicators, as described above with reference to FIGS. 7 and 8, may include a component cache identifier, virtual address of the groups of control registers correlated with the component cache, and/or virtual addresses, sets and/or ways of component cache.

The hypervisor 726 may map the appropriate groups of control registers correlated with the component cache to each master 910 in the system memory management unit 746. With the mapping information between the masters 900 and the groups of control registers, the memory management unit 746 may be enabled to translate virtual address for the control registers of the cache maintenance or status commands issued by the masters 900 to physical addresses for delivering the data of the cache maintenance or status commands to the control registers.

Once the component cache configuration table generation, component cache indicator assignment, and control register mapping is accomplished, the hypervisor 726 may initiate the high level operating system 912 and permit the high level operating system to load the processor and subsystem images 914. The high level operating system 724 may call to functions of the masters 916, which may prompt the masters 900 to discover the component cache capabilities 918 that they have been assigned. In an aspect, the masters 900 may only be able to discover the component cache indicator and/or location 918 to which they have been assigned, and may discover the component cache capabilities by reading the correlated control registers 920. The masters 900 may issue cache maintenance or status commands to the component cache 922 that is assigned to the master 900 via direct access to the correlated control registers. In an aspect, the first cache maintenance or status command issued by the master 900 may be an activation command for the component cache.

Figure 10:
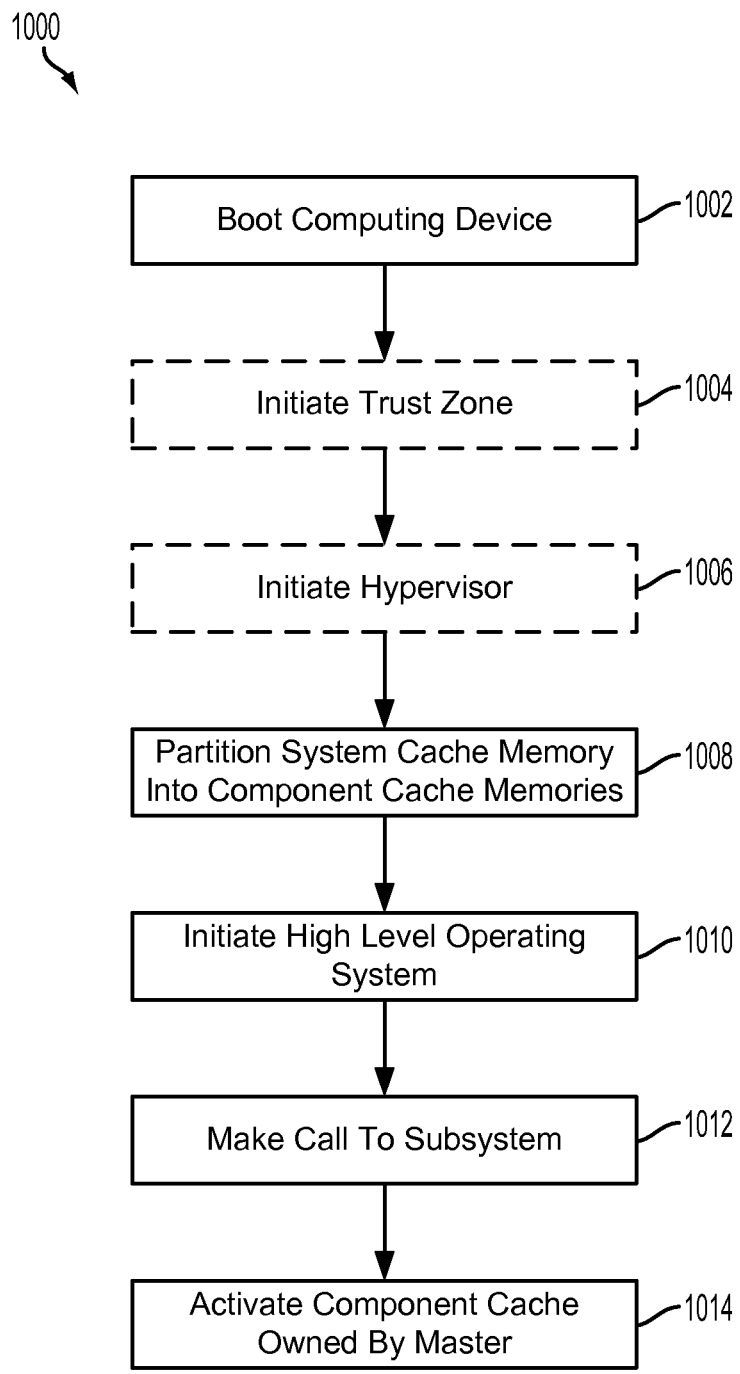
FIG. 10 is a process flow diagram illustrating an aspect method for virtualizing the component cache control registers.

FIG. 10 illustrates an aspect method 1000 for virtualizing the component cache control registers. The method 1000 may be executed by the computing device as described herein, such as by the centralized control entity, and the component cache masters. In block 1002, the computing device may boot. In optional block 1004, the computing device may initiate a trust zone secure environment for ensuring that the boot process is not corrupted by malicious code. In optional block 1006, the computing device may initiate a hypervisor to manage the component cache configuration, and in some aspects access and/or maintenance, as part of the centralized control entity. It is not necessary that the computing device boot using a trust zone secure environment, nor is it necessary that a hypervisor be used to manage the component cache configuration, and in some aspects access and/or maintenance. However, in various aspects, implementation of the trust zone and hypervisor may aid in protecting the computing device from malicious attacks and in managing computing resources.

Figure 11:
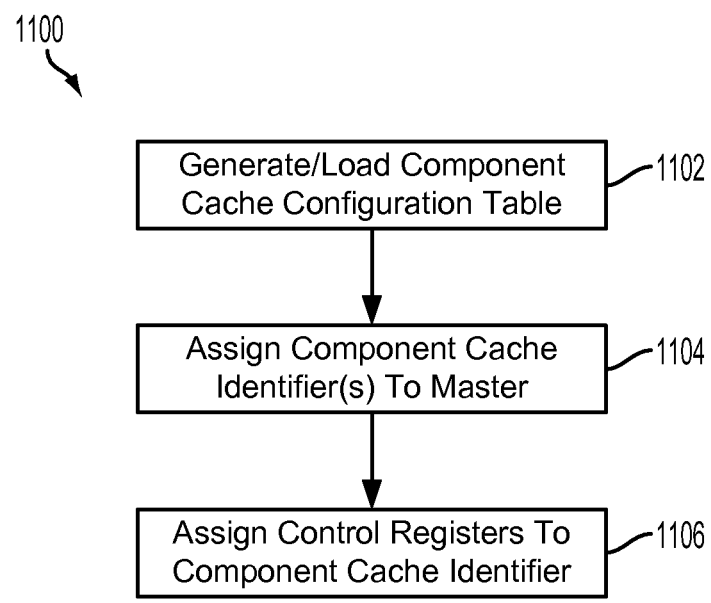
FIG. 11 is a process flow diagram illustrating an aspect method for assigning component cache identifiers to masters.

In block 1008, the computing device may partition the system cache memory into component cache memories, as described further with reference to FIG. 11. In block 1010, the computing device may initiate a high level operating system. In block 1012, the computing device running the high level operating system may make a function call to a processor or subsystem. The function call may prompt the processor or subsystem to use a component cache assigned to that processor or subsystem.

Figure 12:
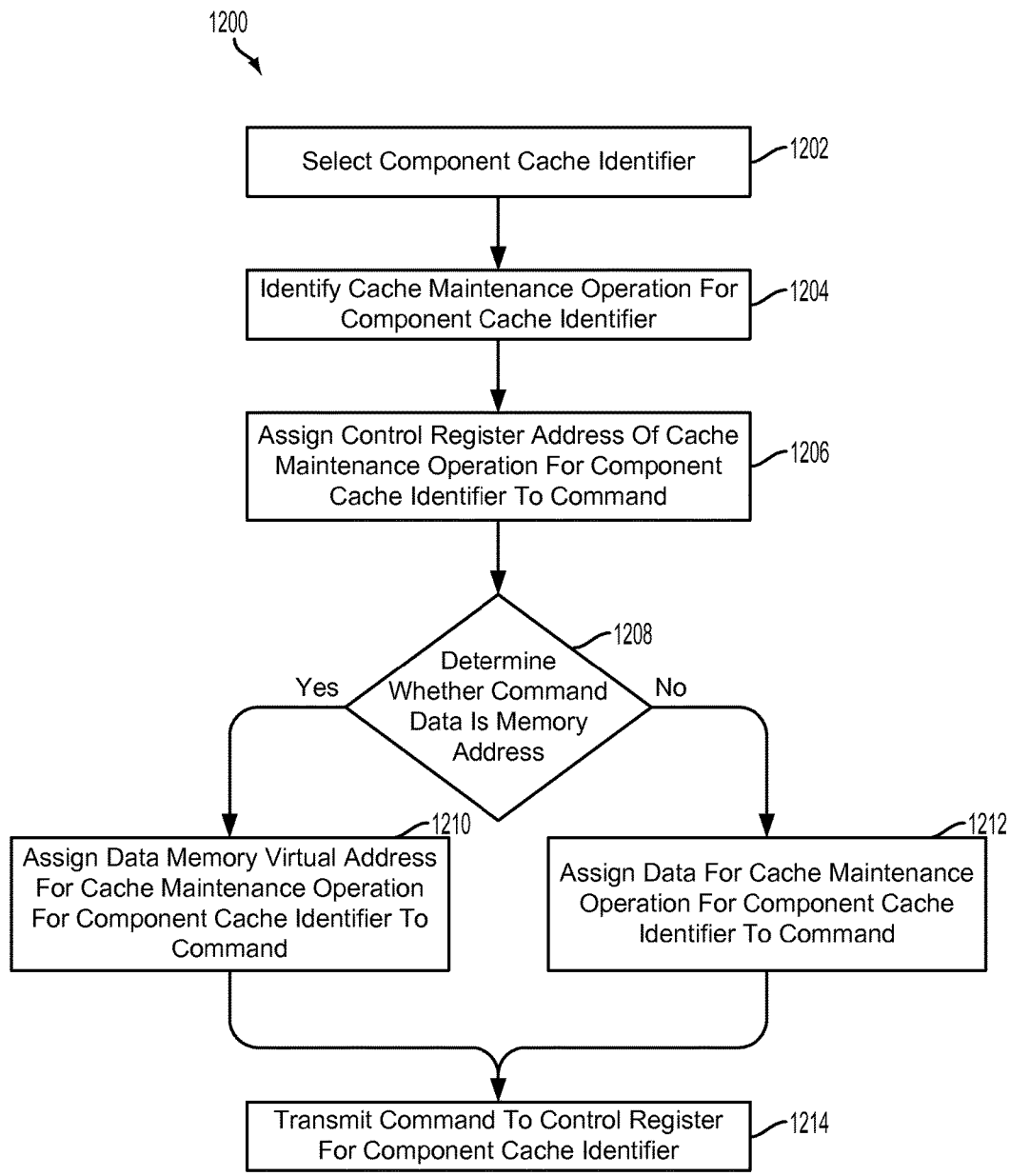
FIG. 12 is a process flow diagram illustrating an aspect method for directly issuing a cache maintenance operation to a component cache control register by a master.

In block 1014, the computing device, via the processor or subsystem, may activate the component cache assigned to the processor or subsystem by issuing an activation command to the activation/deactivation control register associated with the component cache, as described further with reference to FIG. 12.

FIG. 11 illustrates an aspect method 1100 for assigning component cache indicators to masters. The method 1100 may be executed by the computing device as described herein, such as by the centralized control entity, the component cache masters, the system memory management unit, the system cache controller, and the component cache control registers. In block 1102, the computing device may generate or load the component cache configuration table. In an aspect, the component cache configuration table may be generated based on program instructions provided to the computing device for partitioning the system cache memory. In an aspect, the component cache configuration table may be generated based on information retrieved from storage of a pervious configuration of the component cache configuration table.

In block 1104, the computing device may assign the component cache indicators to the masters of the respective component caches. In block 1106, the computing device may assign, or map, the control registers to the component cache indicator information. In an aspect, each master may be a master of at least one component cache and may be assigned a component cache indicator for each of the component caches for which it is a master. As described above, the component cache indicators may include the component cache identifiers of the of respective component caches, the virtual addresses of the control registers correlated with the respective component caches, and/or virtual addresses. The processors and subsystems may store the component cache indicators of the of respective component caches for which they are master.

In an aspect, the component cache indicators may provide the masters with a virtualized view of the control space for their respective component caches, such that the masters are blind to the control space for the other component caches, or to other parts of the system cache. The masters may use the component cache indicators to discover the size, location, and other features of the respective component caches, such as the features of the component cache configuration table. In an aspect, storing the component cache indicators allows the masters to use the component cache indicators to make direct cache maintenance and status commands to the control registers associated with the masters' component caches. In such aspects, the masters do not require the aid of the centralized control entity to issue cache maintenance and status commands to the control registers, and therefore may make direct cache maintenance and status commands even when the centralized control entity is power collapsed.

FIG. 12 illustrates an aspect method 1200 for directly issuing a cache maintenance or status command/operation to a component cache control register by a master. The method 1200 may be executed by the computing device as described herein, such as by the centralized control entity, and the component cache masters. In an aspect, the method 1200 may be implemented as part of block 1014 of the method 1000 for activating a component cache. In an aspect, the method 1200 may also be implemented for issuing any cache maintenance or status command/operation, including activation, deactivation, indicating target ways, or cache cleaning, cache invalidating, or cache cleaning and invalidating based on one or more of cache sets, cache ways, or a cache memory virtual address with a size or a base offset.

In block 1202, the computing device, via a master, may select a component cache indicator assigned to the master. As described above, a master may be assigned multiple component cache indicators associating the master with multiple component caches. The component cache indicator may include one or more of a component cache identifier of a component cache, the virtual addresses of the control registers correlated with the component cache, and/or virtual addresses of the respective component cache.

In block 1204, the computing device, via the master, may identify a cache maintenance or status command/operation for implementing for the component cache correlated with the selected component cache indicator. In block 1206, the computing device may assign a virtual address of the control register for implementing the cache maintenance or status command/operation to the cache maintenance or status command/operation.

As discussed above, the different cache maintenance or status command/operation may be based on different data, which may include data to be written to the control register for implementing the cache maintenance or status command/operation. In an aspect, the data may be representative of a value, such as a flag value or target ways, or a location if the component cache identified by cache sets and/or ways that may be written to the control registers without manipulation. In an aspect, the data may be representative of a location or portion of the component cache where the cache maintenance or status command/operation is to be implemented. In such aspects, the location or portion of the component cache may be represented in the cache maintenance or status command/operation by a memory virtual address, which may be a virtual address for the system cache as known to the master of the component cache.

In determination block 1208, the computing device may determine whether the data for the cache maintenance or status command/operation is a memory virtual address.

In response to determining that the data for the cache maintenance or status command/operation is a memory virtual address (i.e. determination block 1208="Yes"), the computing device may assign the memory virtual address of the component cache to the data portion of the cache maintenance or status command/operation in block 1210. In block 1214 the computing device may transmit the cache maintenance or status command/operation to the control register for the cache maintenance or status command/operation and associated with the component cache. A further aspect of assigning the memory virtual address of the component cache to the data portion of the cache maintenance or status command/operation and transmitting the cache maintenance or status command/operation is described with reference to FIG. 15.

In response to determining that the data for the cache maintenance or status command/operation is not a memory virtual address (i.e. determination block 1208="No"), the computing device may assign data, including a value, such as a flag value or target ways, or a location if the component cache identified by cache sets and/or ways, to the data portion of the cache maintenance or status command/operation in block 1212. The computing device may transmit the cache maintenance or status command/operation to the control register for the cache maintenance or status command/operation and associated with the component cache in block 1214. A further aspect assigning data to the data portion of the cache maintenance or status command/operation and transmitting the cache maintenance or status command/operation is described with reference to FIG. 14. As noted above, the transmission of the cache maintenance or status command/operation to the control register for the cache maintenance or status command/operation and associated with the component cache may be accomplished by transmitting directly between the master and the control registers, via one or more of the system memory management unit and the system cache controller, without the assistance of the centralized control entity.

Figure 13:
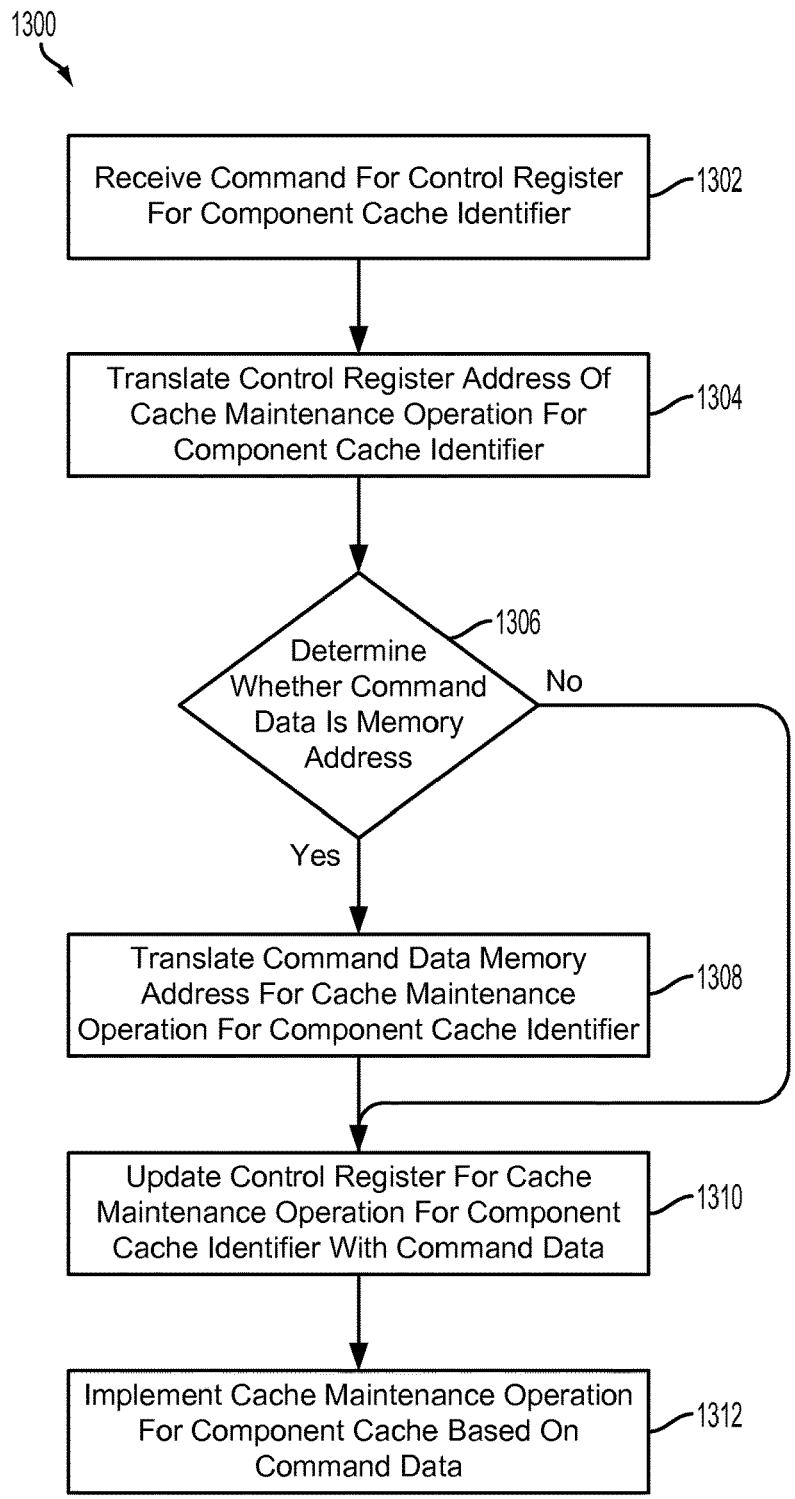
FIG. 13 is a process flow diagram illustrating an aspect method for implementing a cache maintenance operation for a component cache directly issued by a master.

FIG. 13 illustrates an aspect method 1300 for implementing a cache maintenance or status command/operation for a component cache directly issued by a master. The method 1300 may be executed by the computing device as described herein, such as by the centralized control entity, the component cache masters, and the system memory management unit. In an aspect, the method 1300 may be implemented in response to the transmission of the cache maintenance or status command/operation in block 1214 of the method 1200.

In block 1302, the computing device, via the system memory management unit and the system cache controller, may receive the cache maintenance or status command/operation addressed to an appropriate control register associated with the cache maintenance or status command/operation and the component cache.

In block 1304, the computing device, via the system memory management unit and the system cache controller, may translate the virtual address for the control register to a corresponding physical address of the control register. As discussed above, the translation between the virtual addresses and the physical addresses of the control registers may be accomplished using a memory map or an algorithm, provided to the computing device in response to generating the component cache configuration table or preloaded to the computing device.

Also as noted above, the data of the cache maintenance or status command/operation may take multiple formats, including data that does not require translation to be provided to the control registers, and data, such as memory virtual addresses of the system cache memory, that require translation to memory physical addresses to implement the cache maintenance or status command/operation. In determination block 1306, the computing device may determine whether the data of the cache maintenance or status command/operation is a memory virtual address. In an aspect this determination may be made based on a correlation between the virtual or physical address of the control register and a function of the control register. The computing device may contain information that identifies whether a control register at a certain virtual or physical address is configured to receive a memory address for implementing its cache maintenance or status command/operation.

In response to determining that the data of the cache maintenance or status command/operation is a memory virtual address (i.e. determination block 1306="Yes"), the computing device may translate the memory virtual address data of the cache maintenance or status command/operation to a memory physical address of the system cache for implementing the cache maintenance or status command/operation in block 1308. Much like the translation of the control register virtual address to a physical address, the translation between the memory virtual addresses and the memory physical addresses may be accomplished using a memory map or an algorithm, provided to the computing device in response to generating the component cache configuration table or preloaded to the computing device. In an aspect the translation of the memory addresses may be implemented by the system memory management unit and the system cache controller. As part of the translation, the memory virtual address data of the cache maintenance or status command/operation may be replaced by the memory physical address.

In block 1310, the computing device may update the control register associated with the component cache and the cache maintenance or status command/operation with the data provided by the cache maintenance or status command/operation. In block 1312, the computing device may implement the cache maintenance or status command/operation for the designated component cache, or location within the component cache, based on the data of the cache maintenance or status command/operation. A further aspect of updating the control register for the cache maintenance or status command/operation using a memory virtual address as the data is described with reference to FIG. 15.

In response to determining that the data of the cache maintenance or status command/operation is not a memory virtual address (i.e. determination block 1306="No"), the computing device may update the control register associated with the component cache and the cache maintenance or status command/operation with the data provided by the cache maintenance or status command/operation in block 1310. The computing device may further implement the cache maintenance or status command/operation for the designated component cache, or location within the component cache, based on the data of the cache maintenance or status command/operation in block 1312. A further aspect of updating the control register for the cache maintenance or status command/operation using the data is described with reference to FIG. 15.

Figure 14:
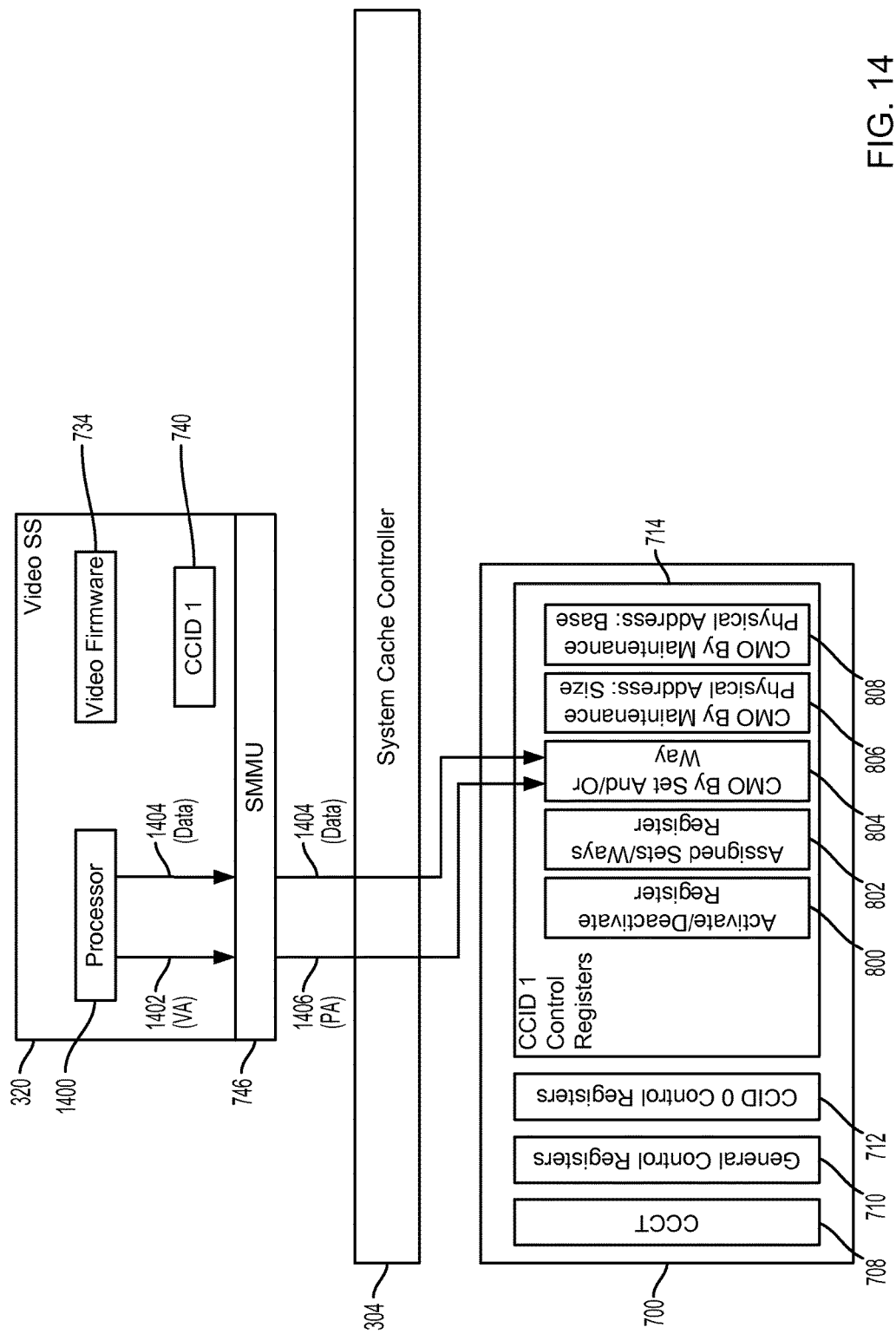
FIG. 14 is a schematic and process flow diagram illustrating an example of a cache maintenance operation direct access in accordance with an aspect.

FIG. 14 illustrates an example of a cache maintenance operation direct access in accordance with an aspect. In an aspect, the computing device may implement a cache maintenance or status command/operation including a virtual address (VA) 1402 configured to identify the location of a target control/status register 800-808, and data 1404 for implementing the cache maintenance or status command/operation. In an aspect, a processor 1400 of a master, for example the video subsystem 320, may issue a cache maintenance or status command/operation including a virtual address 1402 and the data 1404. The memory management unit 746 of the master 320 may translate the virtual address 1402 that identifies the location of a target control/status register 800-808 of the cache maintenance or status command/operation into a physical address (PA) 1406 corresponding to the target control/status register 800-808. The memory management unit 746 may translate the virtual address 1402 into the physical address 1406 using a variety of known techniques. The cache maintenance or status command/operation including the data 1404, and now the physical address 1406 derived from the virtual address 1402, may be routed by the system cache controller 304 to the corresponding target control/status register 800-808, in this example the cache maintenance operation register 804, using the physical address 1406.

Figure 15:
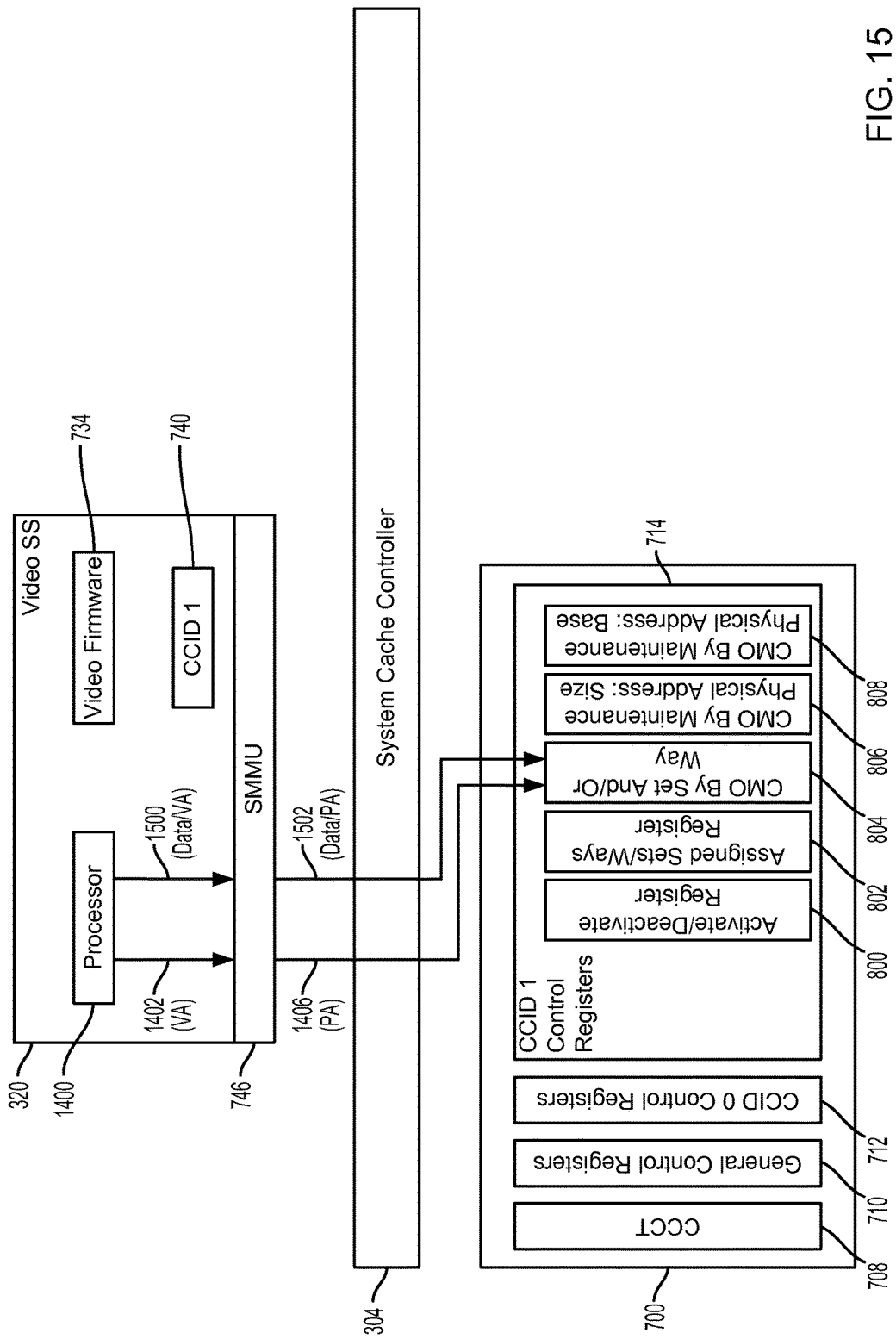
FIG. 15 is a schematic and process flow diagram illustrating an example of translating a virtual memory address from data for a cache maintenance operation direct access in accordance an aspect.

FIG. 15 illustrates an example of translating a virtual memory address from data for a cache maintenance operation direct access in accordance an aspect. In an aspect, the computing device may implement a cache maintenance or status command/operation including a virtual address (VA) 1402 configured to identify the location of a target control/status register 800-808, and a virtual address (VA) as data 1500 for implementing the cache maintenance or status command/operation.

In an aspect, a processor 1400 of a master, for example the video subsystem 320, may issue a cache maintenance or status command/operation including a virtual address 1402 and the virtual address as data 1500. The virtual address as data 1500 may include a virtual address of a location in the component cache assigned to the master 302 for implementing the cache maintenance or status command/operation and written to a data portion of the cache maintenance or status command/operation. The memory management unit 746 of the master 320 may translate the virtual address 1402 configured to identify the location of a target control/status register 800-808 of the cache maintenance or status command/operation into a physical address (PA) 1406 corresponding to the target control/status register 800-808. The memory management unit 746 may also translate the virtual address 1402 of the location in the component cache assigned to the master 302 into a physical address (PA) corresponding to a physical address of the location in the component cache. The translated physical address may be written to the cache maintenance or status command/operation as a physical address as data 1502. As such, the physical address as data 1502 may be written to the data portion of the cache maintenance or status command/operation. The memory management unit 746 may translate the virtual address 1402 and virtual address as data 1500 to the physical address 1406 and the physical address as data 1502 using a variety of known techniques. The cache maintenance or status command/operation including the physical address 1404, and now the physical address as data 1502, derived from the virtual address as data 1500 may be routed by the system cache controller 304 to the corresponding target control/status register 800-808, in this example the cache maintenance operation register 804, using the physical address 1406. The cache maintenance operation register 804 may implement the cache maintenance or status command/operation for the physical address of the component cache using the physical address as data 1502.

Figure 16:
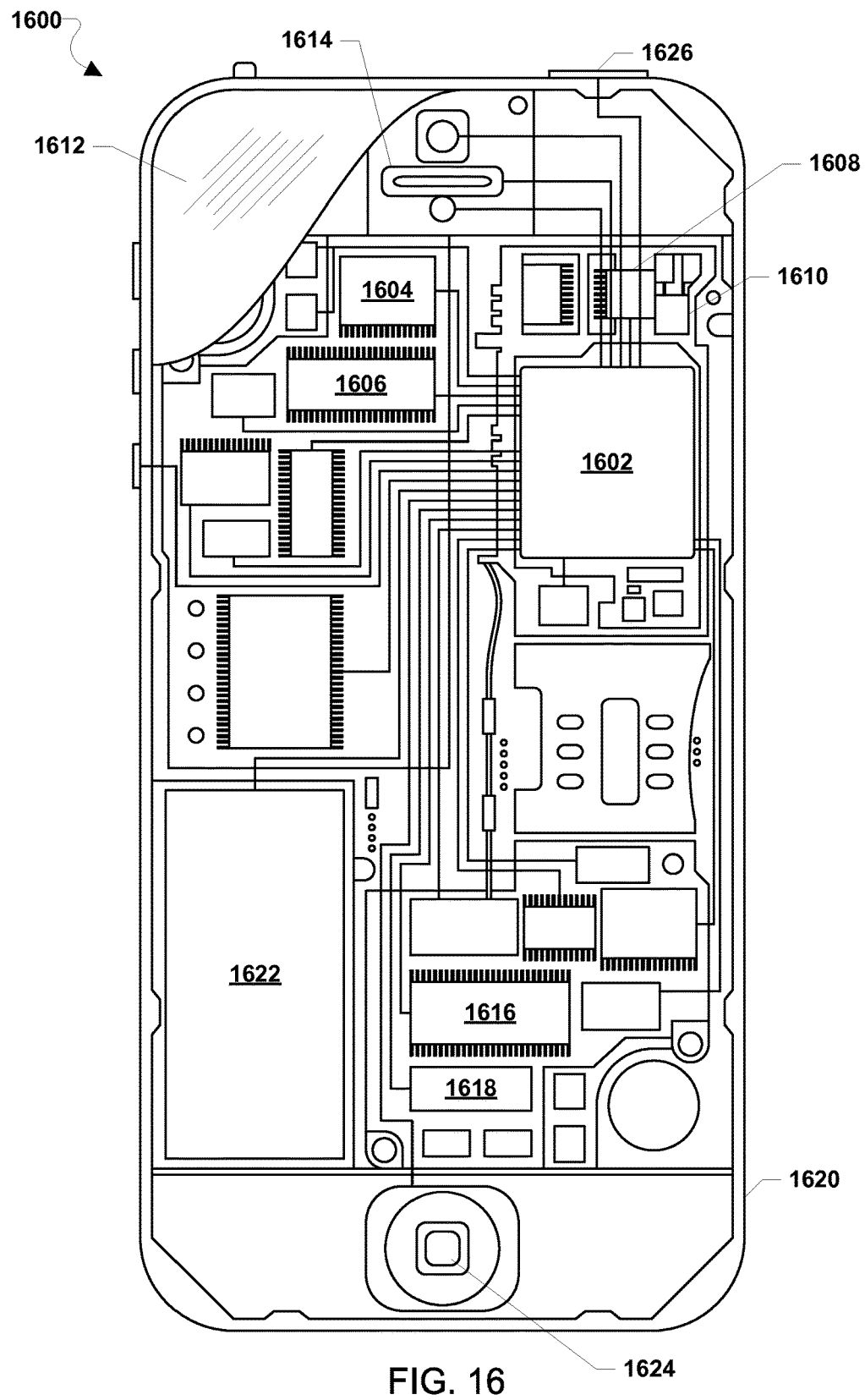
FIG. 16 is component block diagram illustrating an example mobile device suitable for use with the various aspects.

FIG. 16 illustrates an example mobile device suitable for use with the various aspects. With reference to FIGS. 1-14, the mobile device 1600 may include the computing devices and components described with reference to FIGS. 1-3, 7-9, 14, and 15. The mobile device 1600 may include a processor 1602 coupled to a touchscreen controller 1604 and an internal memory 1606. The processor 1602 may be one or more multicore integrated circuits designated for general or specific processing tasks. The internal memory 1606 may be volatile or non-volatile memory, and may also be secure and/or encrypted memory, or unsecure and/or unencrypted memory, or any combination thereof. Examples of memory types which can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1604 and the processor 1602 may also be coupled to a touchscreen panel 1612, such as a resistive-sensing touchscreen, capacitive-sensing touchscreen, infrared sensing touchscreen, etc. Additionally, the display of the computing device 1600 need not have touch screen capability.

The mobile device 1600 may have one or more radio signal transceivers 1608 (e.g., Peanut, Bluetooth, Zigbee, Wi-Fi, RF radio) and antennae 1610, for sending and receiving communications, coupled to each other and/or to the processor 1602. The transceivers 1608 and antennae 1610 may be used with the above-mentioned circuitry to implement the various wireless transmission protocol stacks and interfaces. The mobile device 1600 may include a cellular network wireless modem chip 1616 that enables communication via a cellular network and is coupled to the processor.

The mobile device 1600 may include a peripheral device connection interface 1618 coupled to the processor 1602. The peripheral device connection interface 1618 may be singularly configured to accept one type of connection, or may be configured to accept various types of physical and communication connections, common or proprietary, such as USB, FireWire, Thunderbolt, or PCIe. The peripheral device connection interface 1618 may also be coupled to a similarly configured peripheral device connection port (not shown).

The mobile device 1600 may also include speakers 1614 for providing audio outputs. The mobile device 1600 may also include a housing 1620, constructed of a plastic, metal, or a combination of materials, for containing all or some of the components discussed herein. The mobile device 1600 may include a power source 1622 coupled to the processor 1602, such as a disposable or rechargeable battery. The rechargeable battery may also be coupled to the peripheral device connection port to receive a charging current from a source external to the mobile device 1600. The mobile device 1600 may also include a physical button 1624 for receiving user inputs. The mobile device 1600 may also include a power button 1626 for turning the mobile device 1600 on and off.

Figure 17:
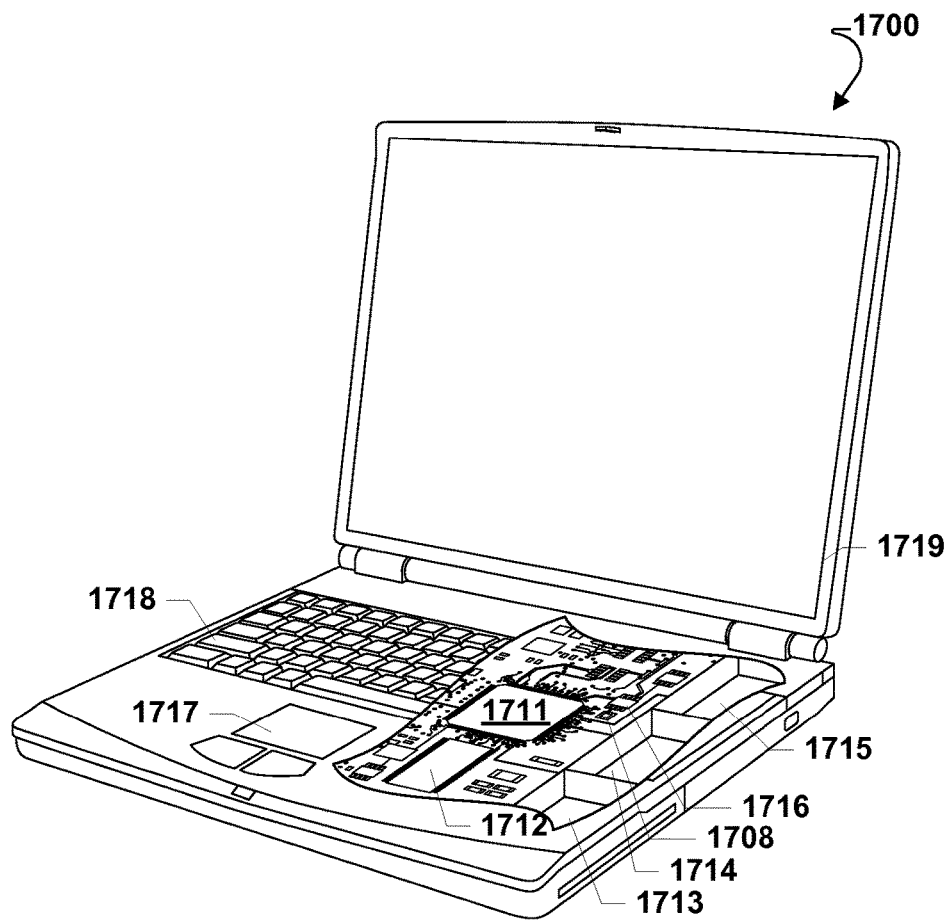
FIG. 17 is component block diagram illustrating an example mobile device suitable for use with the various aspects.

The various aspects described above may also be implemented within a variety of mobile devices, such as a laptop computer 1700 illustrated in FIG. 17. With reference to FIGS. 1-16, the laptop computer 1700 may include the computing devices and components described with reference to FIGS. 1-3 and 7-9. Many laptop computers include a touchpad touch surface 1717 that serves as the computer's pointing device, and thus may receive drag, scroll, and flick gestures similar to those implemented on computing devices equipped with a touch screen display and described above. A laptop computer 1700 will typically include a processor 1711 coupled to volatile memory 1712 and a large capacity nonvolatile memory, such as a disk drive 1713 of Flash memory. Additionally, the computer 1700 may have one or more antenna 1708 for sending and receiving electromagnetic radiation that may be connected to a wireless data link and/or cellular telephone transceiver 1716 coupled to the processor 1711. The computer 1700 may also include a floppy disc drive 1714 and a compact disc (CD) drive 1715 coupled to the processor 1711. In a notebook configuration, the computer housing includes the touchpad 1717, the keyboard 1718, and the display 1719 all coupled to the processor 1711. Other configurations of the computing device may include a computer mouse or trackball coupled to the processor (e.g., via a USB input) as are well known, which may also be use in conjunction with the various aspects.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present invention is not intended to be limited to the aspects shown herein but is to be accorded the widest scope consistent with the following claims and the principles and novel features disclosed herein.

What is claimed is:

1. A method for implementing a cache maintenance or status operation for a component cache, comprising:
   storing, in a memory, a component cache indicator of a component cache such that the component cache indicator is accessible by a master of the component cache;
   issuing a cache maintenance or status command for the component cache to a control register by the master bypassing a centralized control entity, wherein the control register is associated with the cache maintenance or status command and the component cache; and
   receiving the cache maintenance or status command by the control register from the master bypassing the centralized control entity.

2. The method of claim 1, wherein storing a component cache indicator of a component cache such that the component cache indicator is accessible by a master of the component cache comprises providing the master with a virtualized view of a control space for the component cache,
   the method further comprising discovering features of the component cache by the master by bypassing the centralized control entity.

3. The method of claim 1, further comprising:
   assigning an address of the control register associated with the cache maintenance or status command and the component cache to the cache maintenance or status command;
   assigning data to the cache maintenance or status command;
   updating the control register associated with the cache maintenance or status command and the component cache with the data; and
   implementing the cache maintenance or status operation of the control register based on the data.

4. The method of claim 3, wherein assigning data to the cache maintenance or status command comprises assigning a memory virtual address of a cache memory as the data to the cache maintenance or status command.

5. The method of claim 3, further comprising:
determining whether the data of the cache maintenance or status command includes a memory virtual address of a cache memory;
translating the memory virtual address of the cache memory to a memory physical address of the cache memory in response to determining that the data is a memory virtual address of the cache memory; and
replacing the data with the memory physical address of the cache memory.

6. The method of claim 3, wherein the data of the cache maintenance or status command includes at least one cache set and at least one cache way.

7. The method of claim 3, wherein the address of the control register is a virtual address of the control register,
the method further comprising translating the virtual address of the control register to a physical address of the control register.

8. The method of claim 1, further comprising:
generating a component cache configuration table by the centralized control entity;
assigning at least one component cache indicator to the master by the centralized control entity;
mapping at least one control register to the component cache indicator by the centralized control entity; and
concurrently directly accessing a plurality of control registers by a plurality of masters wherein:
issuing a cache maintenance or status command for the component cache by the master bypassing a centralized control entity comprises concurrently issuing a plurality of cache maintenance or status commands for a plurality of component caches by the plurality of masters bypassing the centralized control entity; and
receiving the cache maintenance or status command by a control register associated with the cache maintenance or status command and the component cache bypassing the centralized control entity comprises concurrently receiving the plurality of cache maintenance or status commands by the plurality of control registers associated with the plurality of cache maintenance or status commands and the plurality of component caches bypassing the centralized control entity.

9. A computing device, comprising:
a processor;
a memory configured to be accessible by the processor;
a cache memory configured to provide fast access for storing and retrieving data communicatively connected to the processor;
a system cache controller communicatively connected to the processor, the cache memory, and a plurality of control registers;
a centralized control entity communicatively connected to the processor and the system cache controller; and
a control register communicatively connected to the system cache controller and the processor and assigned to the processor for implementing a cache maintenance or status command for a component cache of the cache memory,
wherein the processor is configured to be a master of the component cache and configured with processor-executable instructions to perform operations comprising:
storing, in the memory, a component cache indicator of the component cache such that the component cache indicator is accessible by the master of the component cache; and
issuing the cache maintenance or status command for the component cache to the control register by the master bypassing the centralized control entity, wherein the control register is associated with the cache maintenance or status command and the component cache, and
wherein the system cache controller is configured to perform operations comprising receiving the cache maintenance or status command for the control register from the master bypassing the centralized control entity.

10. The computing device of claim 9, wherein:
the processor is configured with processor-executable instructions to perform operations such that storing a component cache indicator of the component cache such that the component cache indicator is accessible by the master of the component cache comprises providing the master with a virtualized view of a control space for the component cache, and
the processor is configured with processor-executable instructions to perform operations further comprising discovering features of the component cache by the master by bypassing the centralized control entity.

11. The computing device of claim 9, wherein:
the processor is configured with processor-executable instructions to perform operations further comprising:
assigning an address of the control register associated with the cache maintenance or status command and the component cache to the cache maintenance or status command; and
assigning data to the cache maintenance or status command; and
the system cache controller is configured to perform operations further comprising:
updating the control register associated with the cache maintenance or status command and the component cache with the data; and
implementing the cache maintenance or status operation of the control register based on the data.

12. The computing device of claim 11, wherein the processor is configured with processor-executable instructions to perform operations such that assigning data to the cache maintenance or status command comprises assigning a memory virtual address of a cache memory as the data to the cache maintenance or status command.

13. The computing device of claim 11, further comprising:
a memory management unit coupled to the processor and the system cache controller and configured to perform operations comprising:
determining whether the data of the cache maintenance or status command includes a memory virtual address of the cache memory;
translating the memory virtual address of the cache memory to a memory physical address of the cache memory in response to determining that the data is a memory virtual address of the cache memory; and
replacing the data with the memory physical address of the cache memory.

14. The computing device of claim 11, wherein the data of the cache maintenance or status command includes at least one cache set and at least one cache way.

15. The computing device of claim 11, wherein:
the address of the control register is a virtual address of the control register, and
the system cache controller is configured to perform operations further comprising translating the virtual address of the control register to a physical address of the control register.

16. The computing device of claim 9, wherein:
the centralized control entity is configured to perform operations comprising:
generating a component cache configuration table;
assigning at least one component cache indicator to the master; and
mapping at least one control register to the component cache indicator;
the processor is configured with processor-executable instructions to perform operations further comprising directly accessing the control register concurrent with access of another control register by another master, wherein the processor is configured with processor-executable instructions to perform operations such that issuing a cache maintenance or status command for the component cache by the master bypassing the centralized control entity comprises issuing the cache maintenance or status command for the component cache concurrent with issuing another cache maintenance or status command for another component cache by the another master; and
the system cache controller is configured to perform operations further comprising allowing direct access to the control register concurrent with access of the another control register by the another master wherein the system cache controller is configured to perform operations such that receiving the cache maintenance or status command for the control register associated with the cache maintenance or status command and the component cache bypassing the centralized control entity comprises receiving the cache maintenance or status command for the control register concurrent with receiving the another cache maintenance or status command for the another control register associated with the another cache maintenance or status command and the another component cache.

17. A computing device, comprising:
means for storing, in a memory, a component cache indicator of a component cache such that the component cache indicator is accessible by a master of the component cache;
means for issuing a cache maintenance or status command for the component cache to a control register by the master bypassing a centralized control entity, wherein the control register is associated with the cache maintenance or status command and the component cache; and
means for receiving the cache maintenance or status command for the control register from the master bypassing the centralized control entity.

18. The computing device of claim 17, wherein means for storing a component cache indicator of a component cache such that the component cache indicator is accessible by a master of the component cache comprises means for providing the master with a virtualized view of a control space for the component cache,
the computing device further comprising means for discovering features of the component cache by the master by bypassing the centralized control entity.

19. The computing device of claim 17, further comprising:
means for assigning an address of the control register associated with the cache maintenance or status command and the component cache to the cache maintenance or status command;
means for assigning data to the cache maintenance or status command;
means for updating the control register associated with the cache maintenance or status command and the component cache with the data; and
means for implementing the cache maintenance or status operation of the control register based on the data.

20. The computing device of claim 19, wherein means for assigning data to the cache maintenance or status command comprises means for assigning a memory virtual address of a cache memory as the data to the cache maintenance or status command.

21. The computing device of claim 19, further comprising:
means for determining whether the data of the cache maintenance or status command includes a memory virtual address of a cache memory;
means for translating the memory virtual address of the cache memory to a memory physical address of the cache memory in response to determining that the data is a memory virtual address of the cache memory; and
means for replacing the data with the memory physical address of the cache memory.

22. The computing device of claim 19, wherein the address of the control register is a virtual address of the control register, the computing device further comprising means for translating the virtual address of the control register to a physical address of the control register.

23. The computing device of claim 17, further comprising:
means for generating a component cache configuration table by the centralized control entity;
means for assigning at least one component cache indicator to the master by the centralized control entity;
means for mapping at least one control register to the component cache indicator by the centralized control entity; and
means for concurrently directly accessing a plurality of control registers by a plurality of masters,
wherein:
means for issuing a cache maintenance or status command for the component cache by the master bypassing a centralized control entity comprises means for concurrently issuing a plurality of cache maintenance or status commands for a plurality of component caches by the plurality of masters bypassing the centralized control entity; and
means for receiving the cache maintenance or status command for a control register associated with the cache maintenance or status command and the component cache bypassing the centralized control entity comprises means for concurrently receiving the plurality of cache maintenance or status commands for the plurality of control registers associated with the plurality of cache maintenance or status commands and the plurality of component caches bypassing the centralized control entity.

24. A non-transitory processor-readable medium having stored thereon processor-executable software instructions configured to cause a processor to perform operations comprising:

storing, in a memory a component cache indicator of a component cache such that the component cache indicator is accessible by a master of the component cache;

issuing a cache maintenance or status command for the component cache by the master to a control register bypassing a centralized control entity, wherein the control register is associated with the cache maintenance or status command and the component cache; and receiving the cache maintenance or status command by the control register from the master bypassing the centralized control entity.

25. The non-transitory processor-readable medium of claim 24, wherein:

the stored processor-executable software instructions are configured to cause a processor to perform operations such that storing a component cache indicator of a component cache such that the component cache indicator is accessible by a master of the component cache comprises providing the master with a virtualized view of a control space for the component cache, and the stored processor-executable software instructions are configured to cause a processor to perform operations further comprising discovering features of the component cache by the master by bypassing the centralized control entity.

26. The non-transitory processor-readable medium of claim 24, wherein the stored processor-executable software instructions are configured to cause a processor to perform operations further comprising:

assigning an address of the control register associated with the cache maintenance or status command and the component cache to the cache maintenance or status command;

assigning data to the cache maintenance or status command;

updating the control register associated with the cache maintenance or status command and the component cache with the data; and implementing the cache maintenance or status operation of the control register based on the data.

27. The non-transitory processor-readable medium of claim 26, wherein the stored processor-executable software instructions are configured to cause a processor to perform operations such that assigning data to the cache maintenance or status command comprises assigning a memory virtual address of a cache memory as the data to the cache maintenance or status command.

28. The non-transitory processor-readable medium of claim 26, wherein the stored processor-executable software instructions are configured to cause a processor to perform operations further comprising:

determining whether the data of the cache maintenance or status command includes a memory virtual address of a cache memory;

translating the memory virtual address of the cache memory to a memory physical address of the cache memory in response to determining that the data is a memory virtual address of the cache memory; and replacing the data with the memory physical address of the cache memory.

29. The non-transitory processor-readable medium of claim 26, wherein:

the address of the control register is a virtual address of the control register, and the stored processor-executable software instructions are configured to cause a processor to perform operations further comprising translating the virtual address of the control register to a physical address of the control register.

30. The non-transitory processor-readable medium of claim 24, wherein the stored processor-executable software instructions are configured to cause a processor to perform operations further comprising:

generating a component cache configuration table by the centralized control entity;

assigning at least one component cache indicator to the master by the centralized control entity;

mapping at least one control register to the component cache indicator by the centralized control entity; and concurrently directly accessing a plurality of control registers by a plurality of masters, wherein:

issuing a cache maintenance or status command for the component cache by the master bypassing a centralized control entity comprises concurrently issuing a plurality of cache maintenance or status commands for a plurality of component caches by the plurality of masters bypassing the centralized control entity; and receiving the cache maintenance or status command by a control register associated with the cache maintenance or status command and the component cache bypassing the centralized control entity comprises concurrently receiving the plurality of cache maintenance or status commands by the plurality of control registers associated with the plurality of cache maintenance or status commands and the plurality of component caches bypassing the centralized control entity.

* * * * *